US012120788B2

(12) United States Patent
Unterweger et al.

(10) Patent No.: US 12,120,788 B2
(45) Date of Patent: Oct. 15, 2024

(54) INTERFACES AND TECHNIQUES FOR COST EFFECTIVE CONTROL OF LIGHT EMITTING DIODES IN A VEHICLE

(71) Applicant: Infineon Technologies AG, Neubiberg (DE)

(72) Inventors: Gernot Unterweger, Latschach (AT); Mathias Sedner, Egelsbach (DE); Andrea Scenini, Montegrotto Terme (IT); Hans-Peter Kreuter, Villach (AT)

(73) Assignee: Infineon Technologies AG, Neubiberg (DE)

( * ) Notice: Subject to any disclaimer, the term of this patent is extended or adjusted under 35 U.S.C. 154(b) by 722 days.

(21) Appl. No.: 17/228,299

(22) Filed: Apr. 12, 2021

(65) Prior Publication Data
US 2022/0330400 A1     Oct. 13, 2022

(51) Int. Cl.
*H05B 45/30*     (2020.01)
*B60Q 1/14*      (2006.01)
*B60Q 3/80*      (2017.01)
*H05B 47/125*    (2020.01)

(52) U.S. Cl.
CPC ........... *H05B 45/30* (2020.01); *B60Q 1/1415* (2013.01); *B60Q 3/80* (2017.02); *H05B 47/125* (2020.01); *B60Q 2300/054* (2013.01)

(58) Field of Classification Search
CPC .... H05B 45/30; H05B 47/125; H05B 47/105; H05B 47/155; H05B 47/165; H05B 47/175; H05B 47/18; B60Q 1/1415; B60Q 3/80; B60Q 2300/054
See application file for complete search history.

(56) References Cited

U.S. PATENT DOCUMENTS

| 9,944,218 | B1 * | 4/2018 | Park | H05B 47/28 |
| 2017/0357582 | A1 * | 12/2017 | Decloedt | G06F 13/387 |
| 2019/0132929 | A1 * | 5/2019 | Sturm | H05B 45/00 |
| 2020/0171900 | A1 * | 6/2020 | Pampattiwar | B60D 1/64 |

FOREIGN PATENT DOCUMENTS

KR     1708342 B1 *    2/2017    ......... H04L 65/4076

OTHER PUBLICATIONS

Translation of KR-1708342-B1, Choi (Year: 2017).*
U.S. Appl. No. 16/601,230, filed Oct. 14, 2019, naming inventors Unterweger et al.

* cited by examiner

*Primary Examiner* — Renan Luque
(74) *Attorney, Agent, or Firm* — Shumaker & Sieffert, P.A.

(57) ABSTRACT

A control circuit may be configured to control light emitting diode (LED) driver circuits. The control circuit may be configured to generate a multicast of pixel intensity values based on data in memory or data received from a data source, and output the multicast on an interface, which may comprise a one-wire uni-directional interface. In some examples, a plurality of drivers may receive the multicast, and each of the plurality of drivers may drive different sets of LEDs based on the multicast.

30 Claims, 18 Drawing Sheets

INTERFACES AND TECHNIQUES FOR COST EFFECTIVE CONTROL OF LIGHT EMITTING DIODES IN A VEHICLE

TECHNICAL FIELD

This disclosure relates circuits for driving and controlling light emitting diodes (LEDs), and more specifically techniques for controlling LEDs in a vehicle.

BACKGROUND

Drivers are often used to control a voltage, current, or power at a load. For instance, a light emitting diode (LED) driver may control the power supplied to a string of light emitting diodes. Some drivers may comprise a DC to DC power converter, such as a buck-boost, buck, boost, or another DC to DC converter. Such DC to DC power converters may be used to control and possibly change the power at the load based on a characteristic of the load. DC to DC power converters may be especially useful for LED drivers to regulate current through LED strings.

Some LED circuits include a large number of individually controllable LEDs arranged in a two-dimensional matrix. The individually controllable LEDs can be driven so as to provide advanced lighting effects. Advanced vehicle headlamp systems, for example, are one example application of such LED circuits, whereby advanced lighting effects associated with vehicle operation can be used to improve the driving experience and to promote vehicle safety. Vehicle lighting that uses LED technology may include vehicle headlamps, interior vehicle lighting, exterior vehicle lighting, or any vehicle setting or feature where lighting is used.

SUMMARY

In general, this disclosure is directed to circuits and techniques for controlling light emitting diodes (LEDs) in a vehicle. The techniques may be used to control exterior lights, interior lights, vehicle headlamps, or any vehicle lighting that uses LEDs. According to this disclosure, the interfaces used to communicate pixel intensity values between various units within a vehicle can be defined to promote reliable and effective operation, while simplifying the system and saving on component costs. Furthermore, this disclosure describes data communication techniques and data formatting techniques that can be used for effective control of multiple LED drivers that drive different sets of LEDs for various lighting applications. The techniques may include the use of a multicast of pixel intensity values, whereby the multicast may be sent from a controller to a plurality of different LED drivers. The multicast may be used for controlling the plurality of different LED drivers within a vehicle.

In one example, this disclosure is directed to a control circuit configured to control LED driver circuits. The control circuit may be configured to generate a multicast of pixel intensity values based on data in memory or data received from a data source and output the multicast on an interface. In some cases, the interface comprises a one-wire uni-directional interface.

In another example, this disclosure is directed to an LED driver circuit configured to drive a plurality of LEDs. The LED driver circuit may be configured to receive a multicast of pixel intensity values and drive the plurality of LEDs based on the multicast. In some cases, the interface comprises a one-wire uni-directional interface.

In another example, this disclose is directed to a circuit configured to control LEDs. In this example, the circuit may comprise an LED control circuit configured to generate a multicast of pixel intensity values based on data in memory or data received from a data source, and output the multicast on an interface, wherein interface comprises an interface, and a plurality of LED driver circuits configured to receive the multicast and drive different pluralities of the LEDs based on the multicast.

In another example, this disclose is directed to a method of controlling LEDs of a vehicle. The method may comprise generating a multicast of pixel intensity values based on data in memory or data received from a data source; and outputting the multicast on an interface. In some cases, the interface comprises a one-wire uni-directional interface.

In another example, this disclose is directed to a method of controlling LED of a vehicle, and the method may comprise receiving a multicast of pixel intensity values via an interface and driving the of LEDs based on the multicast. Again, in some cases, the interface comprises a one-wire uni-directional interface.

In another example, this disclosure is directed to a vehicle lighting system comprising LEDs, and a circuit configured to control the LEDs. The circuit may comprise an LED control circuit configured to generate a multicast of pixel intensity values based on data in memory or data received from a data source, and output the multicast on an interface, and a plurality of LED driver circuits configured to receive the multicast and drive different pluralities of the LEDs based on the multicast.

Details of these and other examples are set forth in the accompanying drawings and the description below. Other features, objects, and advantages will be apparent from the description and drawings, and from the claims.

DETAILED DESCRIPTION

Figure 1:
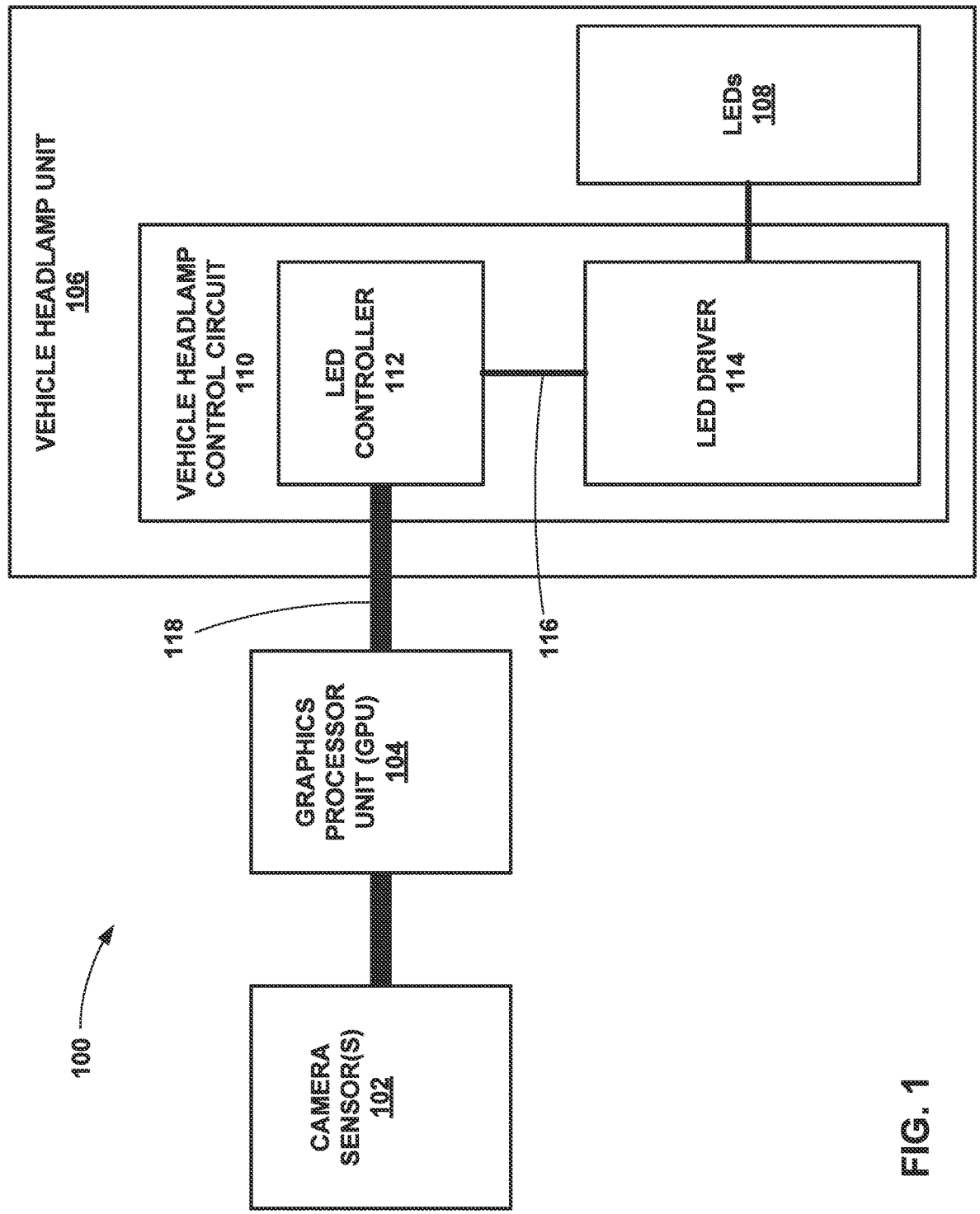
FIG. 1 is a block diagram illustrating a system that captures and delivers video information to a vehicle headlamp control circuit that controls light emitting diodes (LEDs).

This disclosure is directed to circuits and techniques for controlling light emitting diodes (LEDs) in a vehicle. The techniques may be used to control exterior lights, interior lights, vehicle headlamps, or any vehicle lighting that uses LEDs. According to this disclosure, the interfaces used to communicate pixel intensity values data between various units within a vehicle can be defined to promote reliable and effective operation, while simplifying the system and saving on component costs. Furthermore, this disclosure describes data communication techniques and data formatting techniques that can be used for effective control of different sets of LEDs within a vehicle for a wide variety of lighting applications. The techniques may include the use of a multicast of pixel intensity values, whereby the multicast may be sent from a controller to a plurality of different LED drivers. The multicast may be used for controlling the plurality of different LED drivers within a vehicle.

In some examples, this disclosure is directed to circuits useful for advanced vehicle headlamp systems. The circuits may be used to control and drive light emitting diodes (LEDs) with advanced lighting effects. Moreover, the circuits may include interfaces that are configured to promote cost effective video communication within the advanced vehicle headlamp systems.

In some examples, the circuits may control and drive LED's so as to achieve glare reductions perceived by the operators of other vehicles, to enhance illumination of one or more objects, to adjust or project visual aids or guiding elements in order to help the vehicle operator (e.g., to present guiding elements on the road), to project one or more symbols, to project guiding lines for the vehicle operator (e.g., to present guide lines on the road), to shape light projected by the LEDs, to reduce light intensity of a portion of light projected by the LEDs, to present symbols, images, or trademarks during vehicle start-up or vehicle idle, or to achieve other effects. Such light adjustments may be performed based on navigation information collected or presented by the vehicle, based on object detection, or based on other factors. The vehicle may be equipped with cameras that can capture real-time video, which can be processed to perform such object detection. According to this disclosure, the interfaces used to communicate video data between various units outside of the vehicle headlamp and within the vehicle headlamp can be defined to promote reliable and effective communication of video data, while simplifying the system and saving on component costs.

Furthermore, in some examples, the techniques of this disclosure may include sending and receiving a multicast of pixel intensity values, whereby the multicast may be sent from a controller to a plurality of different LED drivers. The multicast may be used for controlling the plurality of different LED drivers within a vehicle. In some cases, the plurality of LED drivers may include a plurality of drivers associated with a vehicle headlamp. Also, in some cases, the plurality of drivers may include one or more drivers for interior lighting and one or more drivers for exterior lighting. The plurality of drivers may include LED drivers for any set of one or more LEDs of a vehicle. The techniques of this disclosure may include sending and receiving a multicast of pixel intensity values for controlling some or all of the LED drivers within a vehicle.

FIG. 1 is block diagram illustrating a system that captures and delivers video information to a vehicle headlamp control circuit that controls light emitting diodes LEDs. In particular, FIG. 1 illustrates an adaptive vehicle lighting system 100 comprising one or more camera sensors configured 102 to capture video data associated with a scene illuminated by the vehicle lighting system, a graphics processing unit (GPU) 104 that processes the video data, and a vehicle headlamp unit 106 including a set of LEDs 108 that may be arranged in a two-dimensional matrix, and a vehicle headlamp control circuit 110 configured to control the LEDs 108.

Vehicle headlamp control circuit 110 may comprise an LED controller 112 configured to receive the processed video data from the GPU a first interface 118, which may comprise high speed video interface, or a differential interface commonly used in automobile circuit applications. Vehicle headlamp control circuit 110 may further comprise an LED driver 114, such as a DC-DC converter or other power device that is configured to drive the LEDs based at least in part on the processed video data.

GPU 104 may process raw video data and generate processed video data that is processed so as to achieve desired lighting effects by LEDs. Such processing by GPU 104, for example, may be based on navigation information collected or presented by the vehicle, based on object detection, or based on other factors. For example, camera sensors 102 may deliver real time video in raw format to GPU 104, and GPU may process the raw video to identify scenes, roadways, features, obstacles, or other elements within the raw video data. In some examples, GPU may perform one or more object detection algorithms on the raw video data in order to identify objects or elements within the video data captured by camera sensors 102. Based on such object detection algorithms, GPU 104 may modify the raw video data so as to generate processed video data, and the processed video data may be modified relative to the raw video data in a way that can achieve desired lighting effects by LEDs 108.

For example, object detection may be used to identify oncoming traffic, road hazards, or obstacles. Such object detection may be used to modify the raw video data such that the processed video data has pixelated data adjustments relative to the raw video data. The pixelated data adjustments may adjust the raw video data in places where objects are detected in the field of view. In this way, the processed data itself may be changed in a way that can help to achieve lighting effects by LEDs 108, such as glare reductions perceived by the operators of other vehicles, illumination of one or more objects, presentation of visual aids or guiding elements in order to help the vehicle operator projections of one or more symbols, projections of guiding lines for the vehicle operator, light shaping, reductions in light intensity, presentation of symbols, shapes or symbols, or the presentation of other effects. Other desirable lighting effects may also include the illumination of Trademarks or symbols, such as for presenting the driver with a welcome message or lighting effects when the vehicle is started or when the vehicle is in a parked mode.

Referring again to the object detection, GPU 104 may process raw video data and identify oncoming traffic in the raw video data. In this case, such objects may be used to cause specific pixelated intensity reductions such that LEDs 108 achieve glare reductions to the oncoming traffic. As another example, GPU 104 may process raw video data to identify an object or road hazard, such as on animal on the roadway, and in this case, objects may be used to cause specific pixelated intensity increases such that LEDs 108 illuminate the object with more light. The raw video data may comprise as a bit-map of RGB intensity values, and the processed video data may comprise a similar bit map of RGB intensity values that includes intensity adjustments to those pixels associated with the object detection.

Although RGB intensity values are discussed herein with regard to the video data, other video data formats could be such, such as formats that use chrominance and luminance values, LUV formats, CMYK formats, vectorized video data formats, or other video data formats. A bitmap of intensity values can be viewed as a bitmap of a video image, and can also be viewed as a bitmap of intensity values used to drive individual pixels of a matrix of LEDs. Thus, by processing a bitmap of an image, GPU can essentially define a new bitmap of that image that is modified to achieve object detection, glare reduction, or other effects when that same bitmap is used to drive LEDs 108.

As mentioned above, first interface 118 may comprise high speed video interface, or a differential interface commonly used in automobile circuit applications. Examples of first interface 118 may include an ethernet interface; a gigabit multimedia serial link (GMSL) interface; a controller area network (CAN) bus interface; a controller area network-flexible data (CAN-FD) bus interface; an interface defined according to a FlexRay protocol; a link defined according to a low voltage differential signaling (LVDS) standard, such as FPD-Link, FlatLink, FPD-Link II, FPD-Link III, and OpenLDI; or a controller area network-extra-large (CAN-XL) bus interface.

In contrast to first interface 118, which communicates video data from the outside to vehicle headlamp unit 106, second interface 116 communicates video data within vehicle headlamp unit 106. Furthermore, this disclosure recognizes component costs savings that can be achieved by simplifying second interface 116 relative to first interface 118, while still achieving reliable and effective video data communication within vehicle headlamp unit 106.

In some examples, the second interface 116 communicates video data at a slower data rate than the first interface 118. For example, second interface 116 may comprise an interface that operates according to a master-slave protocol. In some examples, second interface 116 comprises a unidirectional interface. In some examples, second interface 116 comprises a single wire interface. In some examples, second interface 116 comprises one wire interface typically used to support video displays with less than 40,000 pixels. In some examples, second interface 116 sends video data row by row, whereas first interface 118 may send video data video frame-by-video frame. In some cases, second interface 116 comprises an asynchronous interface. In some examples, the data resolution (e.g., the bit depth) of video data sent over interface 116 may be lower than the data resolution (e.g., the bit depth) of video data sent or interface 118, but in other cases, the data resolution (e.g., the bit depth) may be the same for video data sent over first interface 118 and second interface 116.

In addition to the object detection or other processing that may be performed by GPU 104, in some examples, additional video data adjustments can be made, such as so-called Gamma corrections to the video data. In some examples, Gamma corrections are performed by GPU 104 after the initial processing of the video data discussed above. In some examples, Gamma corrections are performed by LED controller 112 after GPU 104 processing of the video data discussed above. And in still other examples, LED driver 114 may be configured to perform the Gamma corrections. Gamma corrections or other video data adjustments may be used to further improve the lighting that is achieved by LEDs 108. Processed and adjusted video data (e.g. data that is processed by GPU 104 and then adjusted with Gamma corrections) may still comprise a bit map of RGB intensity values (or other formats) that includes intensity adjustments to those pixels associated with the object detection, intensity adjustments to those pixels used for presenting guiding lines or guiding features, as well as Gamma correction adjustments. LED driver 114 may then use the processed and adjusted video data (e.g., a bitmap) to drive LEDs 108, which may comprise a matrix of LEDs having pixels that correspond to the intensity values defined in the bitmap of video data.

In some examples, GPU 104 is configured to process video data, LED driver 114 is configured to adjust the processed video data, and LED driver 114 is configured to drive the LEDs based at least in part on the processed and adjusted video data. In some examples, GPU 104 is configured to process and adjust the video data, and LED driver is configured to drive the LEDs based at least in part on the processed and adjusted video data. In some examples, GPU 104 is configured to process video data, LED controller 112 is configured to adjust the processed video data, and LED driver 114 is configured to drive the LEDs based at least in part on the processed and adjusted video data. In some examples, GPU 104 performs object detection to process the video data and LED driver 114 performs a Gamma Correction on the processed video data to adjust the processed video data. In still other examples, GPU 104 may perform object detection and Gamma corrections, before sending the processed and adjusted video data to LED controller 112.

Although not shown in FIG. 1, in some cases, vehicle headlamp control circuit 110 may also control additional devices or additional sets of lights, such as daytime running lights (DRLs). However, DRLs are not shown in FIG. 1 for simplicity. In still other cases, other circuits may control DRLs.

In some examples, this disclosure is directed to a vehicle headlamp unit 106 comprising a set of LEDs 108 and a vehicle headlamp control circuit 110 configured to control the set of LEDs 108. The set of LEDs 108 may comprise individually controlled LEDs arranged in a two-dimensional matrix. Vehicle headlamp control circuit 110 may comprise an LED controller 112 configured to receive video data from a video source via a first interface 118, and an LED driver 114 configured to drive the LEDs based at least in part on the video data. A second interface 116 between the LED controller 112 and LED driver 116 may be configured to communicate the video data from LED controller 112 to LED driver 114 at a slower data rate than the data rate of first interface 118.

Again, the set of LEDs 108 may comprise a matrix of individually controlled LEDs. LED driver 114 may be configured to control the intensity of different ones of the individually controlled LEDs based on the video data, such as by using a processed and adjusted bit map to define the intensity provided to each individual LED of the set of LEDs 108.

Video data received by LED controller 112 from a video source (such as GPU) may comprise processed video data that is based on raw video data from camera sensors 102 and object detection. Alternatively, in some cases, GPU 104 may be eliminated and raw video data (without processing or object detection may be sent directly from camera sensors 102 to LED controller, in which case the first interface 118 would define the interface directly between camera sensors 102 and LED controller 112 (not shown in FIG. 1).

Second interface 116 may be simplified relative to first interface 118 in order to save component cost, while still achieving reliable and effective communication of video data within vehicle headlamp unit 106. In some examples, second interface 116 may comprises a one-wire uni-directional interface, whereas first interface 118 may comprise a multi-wire differential interface. First interface 118 may comprise high speed video interface, or a differential interface commonly used in automobile circuit applications. Examples of first interface 118 may include an ethernet interface; a GMSL interface; a CAN bus interface; a CAN-FD bus interface; an interface defined according to a FlexRay protocol; a link defined according to a LVDS standard, such as FPD-Link, FlatLink, FPD-Link II, FPD-Link III, and OpenLDI; or a CAN-XL bus interface. In contrast, second interface 116 may comprise an interface that operates according to a master-slave protocol.

LED driver 114 may be configured to adjust video data, such as by performing a Gamma correction process on the processed video data, and the LED driver 114 may be configured to drive the set of LEDs 108 based at least in part on the adjusted video data. Prior to this, however, GPU 104 may perform one or more of the following processing steps on the video data: adjusting the video data based on navigation information; adjusting the video data to reduce glare of light projected by the LEDs based on object detection; adjusting the video data to enhance illumination of one or more objects illuminated by the LEDs based on object detection; adjusting the video data to project one or more guiding elements by the LEDs; adjusting the video data to project one or more symbols by the LEDs; adjusting the video data to project one or more guiding lines by the LEDs; adjusting the video data to shape light projected by the LEDs; and adjusting the video data to reduce intensity of at least a portion of light projected by the LEDs.

Figure 2:
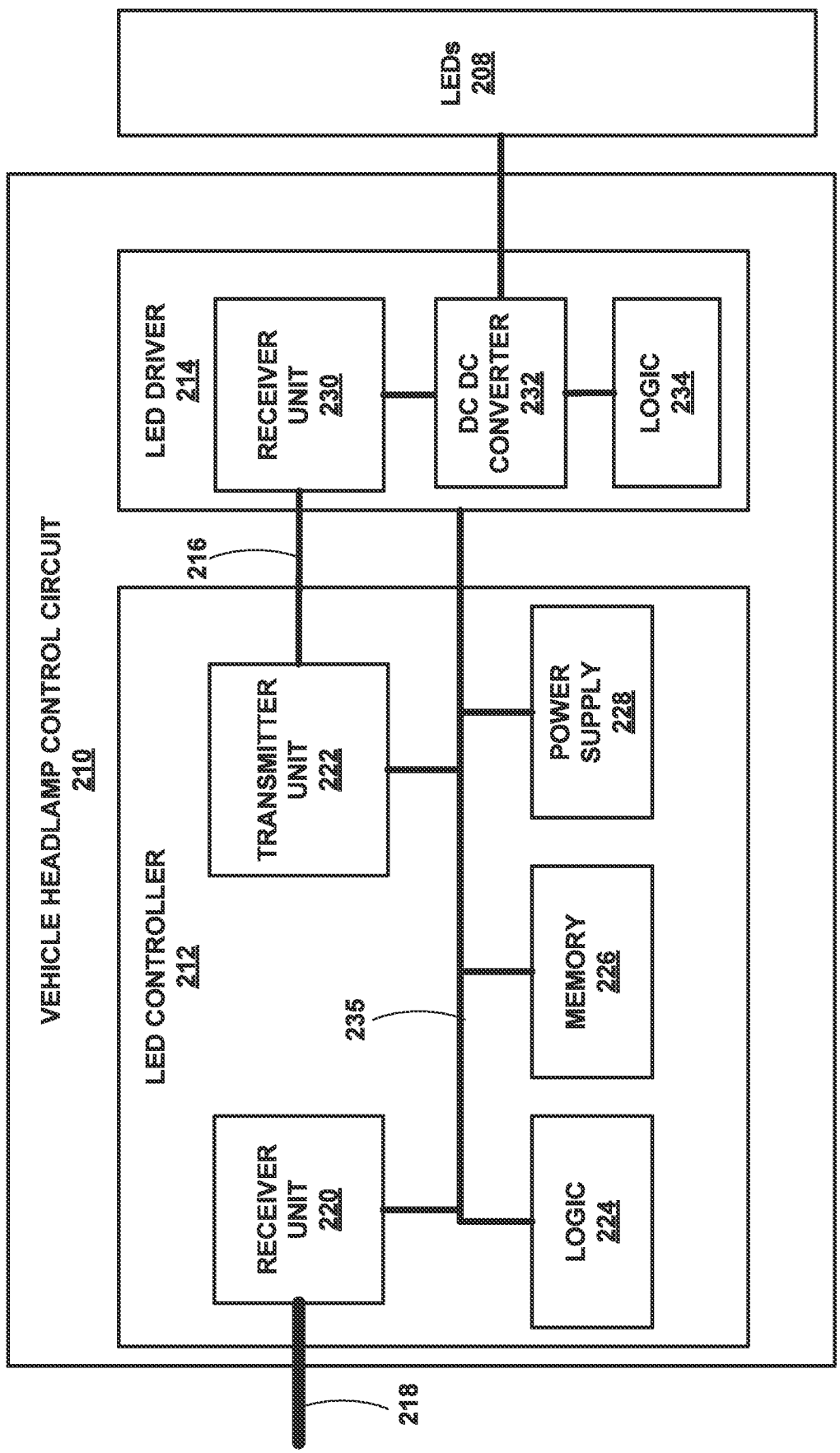
FIG. 2 is another block diagram illustrating exemplary details of a vehicle headlamp control circuit.

FIG. 2 is another block diagram illustrating exemplary details of a vehicle headlamp control circuit 200. In some examples, vehicle headlamp circuit 200 may illustrate a more detailed example of vehicle headlamp circuit 100 shown in FIG. 1, although vehicle headlamp circuit of FIG. 1 would also differ from circuit 200 in other examples.

In the example shown in FIG. 2, vehicle headlamp circuit 210 is configured to control a set of LEDs 208. In particular, vehicle headlamp circuit 200 includes an LED controller 212 and an LED driver. A first interface 218 delivers video data to LED controller 212 from an external source (such as directly from cameras, from a GPU, or from storage), and second interface 216 delivers video data from LED controller 212 to LED driver 214 within vehicle headlamp circuit 210. Second interface 216 may be defined to promote reliable and effective data communication without the need for an ultra-high-speed video communication, which can simplify the circuit and save on circuit component costs. Accordingly, second interface 216 may comprise a lower cost interface (possibly lower quality or lower speed interface) than the first interface 218, while still providing reliable and effective video data communication necessary between the LED controller and the LED driver.

LED controller 212 may include a receiver unit 220 configured to receive data from first interface 218 and a transmitter unit 222 configured to send data over second interface 216. Thus, receiver unit 220 and transmitter unit 222 may communicate using different communication protocols. LED controller 212 may include a power supply 228 for powering LED controller and possibly for powering LED driver 214. LED controller 212 may also include memory 226 for storing or buffering video data or other data or instructions, and logic 224 (or a processor) for performing functions related to LED control. The components of LED controller 212 may be communicatively coupled to one another, such as via CAN bus 235, or another type of data bus 235 or one or more communication interfaces.

LED driver 214 may include a receiver unit 230 configured to receive video data from second interface 216. In addition, LED driver 214 may include a DC DC converter 232 configured to regulate current through LEDs 208, and logic 234 (or a processor) for performing functions related to driving or controlling LEDs 208.

In some examples, vehicle headlamp circuit 210 is configured to control a vehicle headlamp comprising LEDs 208. LED controller 212 may be configured to receive video data at receiver unit 220 from a video source that sends such data via first interface 218. LED driver 214 may be configured to drive LEDs 218 based at least in part on the video data. Second interface 216 between the LED controller 212 and LED driver 214 is configured to communicate the video data from transmitter unit 222 of LED controller 212 to receiver unit 230 LED driver 214. In some cases, second interface 216 communicates the video data at a slower data rate than first interface 218 so as to reduce the component costs associated with second interface 216 inside vehicle control circuit 210, while still achieving effective and reliable data communication needed for controlling advanced vehicle headlamps.

LEDs 208 may comprise a matrix of individually controlled LEDs, and LED driver 214 is configured to control the intensity of different ones of the individually controlled LEDs based on the video data. In particular, DC DC converter 232 may be configured to regulate current through the individually controlled LEDs within LEDs 208. LED controller 212 may control the regulation of current by controlling DC DC converter 232, or in some cases, logic 234 may be configured to control DC DC converter 232 based on information received from LED controller 212. The various processing and adjustments to video data (such as object detection, Gamma corrections, or other processing)

may be performed by an external GPU, by logic 224 of LED controller 212, or by logic 234 of LED driver 214. In some examples, object detection is performed by an external GPU and Gamma corrections to the video data are performed by logic 224 of LED controller 212 or by logic 234 of LED driver 214.

Video data may be captured by external cameras (not shown in FIG. 2), and possibly processed by a GPU (not shown in FIG. 2). The video data may comprise real-time video data associated with a scene illuminated by LEDs 218, and the video data may be communicated from a video source (cameras or the GPU) to LED controller 212 via first interface 218. If sent from a GPU, for example, the video data received by LED controller 212 via first interface 218 may comprise processed video data that is based on raw video data and object detection.

In some examples, second interface 216 may comprise a one-wire uni-directional interface, which may be well suited for video data communication within a circuit. In contrast, first interface comprises a multi-wire differential interface, which may be well suited for video data communication between circuits. Different protocols may be used for communicating data over first interface and second interface, and different video data formats may be used. Video data compression (encoding and decoding) may also be performed at one or more stages of the data communication, in which case encoders and decoders (not shown) may be used by receiver units and transmitter units. However, video data compression may also be avoided, and this disclosure is not necessarily limited to any use or non-use of video data compression.

In some examples, first interface 218 communicates data video frame-by-video frame and second interface 216 communicates data row-by-row. In some cases, logic 224 of LED driver 212 may be configured to adjust the video data, and the LED driver 214 may be configured to drive the LEDs based at least in part on the adjusted video data. For example, logic 214 may adjust video data by performing a Gamma Correction process on the video data. Or alternatively, logic 234 of LED driver 214 may be configured to perform the Gamma Correction process on the video data.

As examples, first interface 218 may comprise an ethernet interface; a GMSL interface; a CAN bus interface; a CAN-FD bus interface; an interface defined according to a FlexRay protocol; a link defined according to an LVDS standard, such as FPD-Link, FlatLink, FPD-Link II, FPD-Link III, and OpenLDI; or a CAN-XL bus interface. Moreover, first interface 218, in some examples, may comprise a bi-directional interface and/or a differential two-wire interface. In contrast to first interface 218, second interface 216 may comprises an interface that operates according to a master-slave protocol. In some examples, second interface 216 comprises a uni-directional one-wire interface.

Although not shown in FIG. 2, in some cases, vehicle headlamp control circuit 210 may also control additional devices or additional sets of lights, such as daytime running lights (DRLs). For example, LED controller 212 may coordinate DRLs, along with LEDs 208, and a separate driver may be used for DRLs. Or LED controller 212 may coordinate DRLs and driver 214 may be used to drive the DRLs in addition to driving LEDs 208. However, DRLs are not shown in FIG. 2 for simplicity. In still other cases, other circuits may control DRLs.

Figure 3:
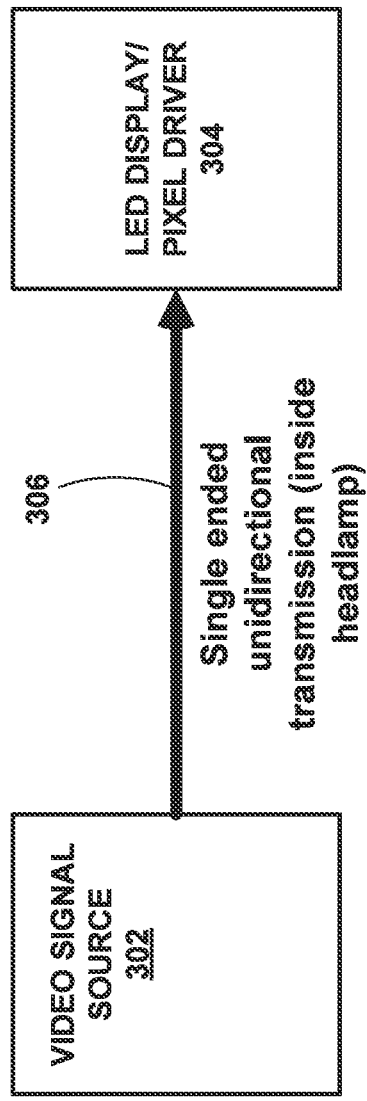
FIG. 3 is a general block diagram showing single ended unidirectional communication of video information inside a vehicle headlamp unit.

FIG. 3 is a general block showing single ended unidirectional communication of video information inside a vehicle headlamp unit. A video signal source 302 captures, processes, or stores real-time video data, and the video data is communicated to LED display or pixel driver 304 via a single ended unidirectional transmission interface 306, which may reside inside a vehicle headlamp. Interface 306 may be similar to second interface 116 (FIG. 1) or second interface 216 (FIG. 2) described above. Interface 306 may be configured to promote reliable and effective data communication without the need for an ultra-high-speed video communication, which can simplify the circuit and save on circuit component costs.

Figure 4:
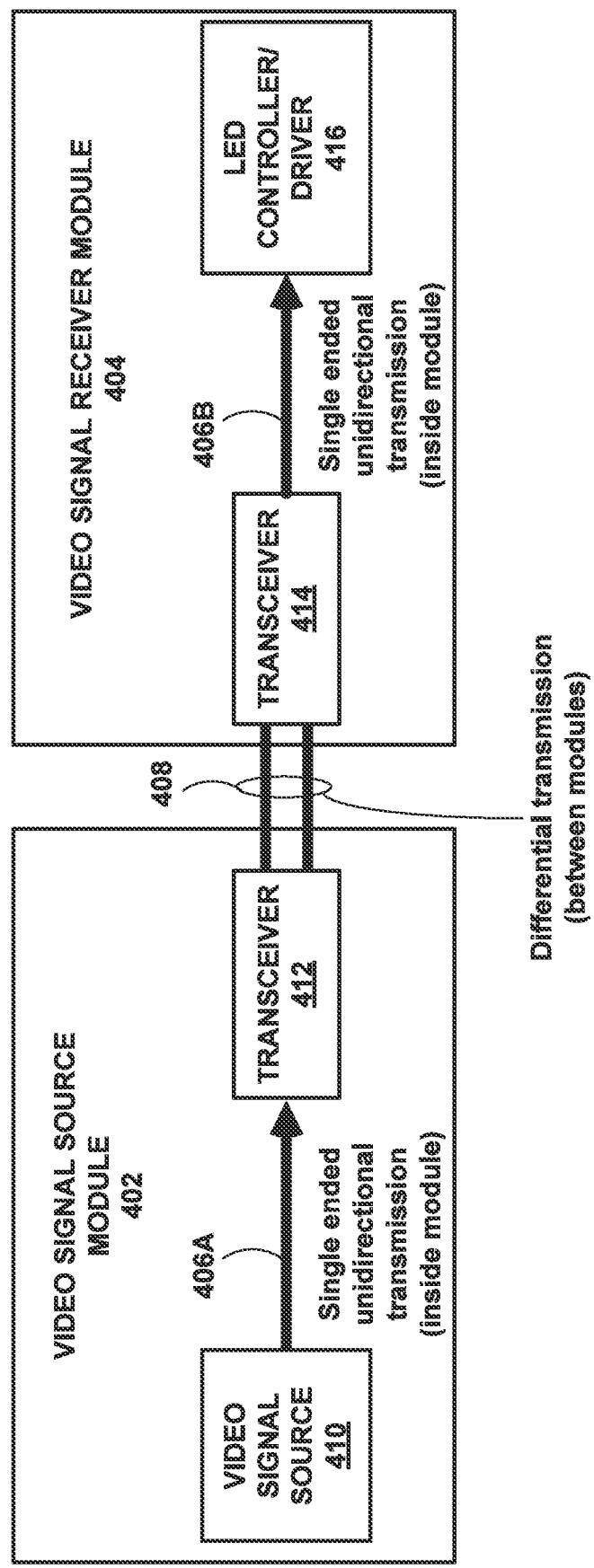
FIG. 4 is a block diagram showing single ended unidirectional communication of video information inside a video signal source module, single ended unidirectional communication of video information inside a video signal receiver module, and differential communication of video information between the video signal source module and the video signal receiver module.

FIG. 4 is a block diagram showing a video signal source module 402 that is communicatively coupled to a video signal receiver module 404 via a first interface 408. In some examples, video signal source module 402 and video signal receiver module 404 may each comprise separate circuit packages that include circuits that are packaged for modular connection to other circuit packages or for mounting on circuit boards, and first interface 408 may comprise an external interface that facilitate communication between the modules. In some cases, video signal source module 402 and video signal receiver module 404 may comprise so-called "flip-chips" configured for flip-chip style installation on a circuit board. In some examples, transceiver 412, transceiver 414, and LED controller/driver 416 may all comprise flip chips. In any case, the techniques of this disclosure may be very useful for modular design of circuits, enabling low-cost one-way video communication between some modules and higher quality differential communication between other modules. In some cases, for example, it may be desirable to facilitate low-cost one-way video communication between circuit modules that reside within a given circuit package (e.g., within a common housing), and to facilitate and higher quality differential communication between modules that reside in different circuit packages (e.g., within different housings).

Video signal source model 402 may comprise video signal source 410, such one or more cameras, a GPU, memory, or another source of video data. Video signal source model 402 may also include a transceiver 412. Video signal source 410 may communicate video data to transceiver 412 via a signal ended unidirectional communication over a second interface 406A which may comprise a single wire interface that is internal to a circuit package associated with video signal source module 402. Second interface 406A, for example, may be similar to second interface 116 (FIG. 1) or second interface 216 (FIG. 2) described above.

Video signal receiver module 404 may also include a transceiver 414. In addition, video signal receiver module 404 may include an LED controller/driver 416, which may represent a separate controller and driver or a combined controller and driver.

Transceiver 414 of video signal receiver module 404 may communicate video data to LED controller/driver 415 via a signal ended unidirectional communication over third interface 406B. Third interface 406B (like second interface 406A) may be similar to second interface 116 (FIG. 1) or second interface 216 (FIG. 2) described above. Second and third interfaces 406A and 406B may be internal to the respective circuit modules and may be fully housed or contained within respective circuit packages. Inside the modules, second and third interfaces 406A and 406B may be configured to promote reliable and effective data communication without the need for an ultra-high-speed video communication, which can simplify the circuit and save on circuit component costs. If the components of LED controller/driver 416 are separate (i.e. separate modules or packages), the separate driver and controller modules may also have yet another internal interface that is similar to interface 406B.

According to FIG. 4, video data communication within video signal source module 402 and video signal receiver module 404 is signal ended unidirectional communication over internal interfaces 406A and 406B. In contrast, according to FIG. 4, video data communication between video signal source module 402 and video signal receiver module 404 is differential communication. In particular, first interface 408 may comprise a differential two wire interface configured to support high speed reliable data communication between video signal source module 402 and video signal receiver module 404.

In one example, the system shown in FIG. 4 comprises a video signal source module 402 comprising a video signal source 410 and a first transceiver 412. The system of FIG. 4 may also include a video signal receiver module 404 comprising a second transceiver and a circuit (e.g., LED controller/driver 416) that is configured to control LEDs. The system of FIG. 4 may also include a first interface 408 configured to communicate the video data between video signal source module 402 and video signal receiver module 404, e.g., from first transceiver 412 to second transceiver 414. Video signal source module 402 may include a second interface 406A within video signal source module 402, wherein the second interface 406A is configured to communicate video data from the video signal source 410 to the first transceiver 412. Similarly, video signal receiver module may include a third interface 406B within the video signal receiver module 404, wherein the third interface 406B is configured to communicate the video data from the second transceiver 414 to the circuit configured to control LEDs (e.g., LED controller/driver 416). In some examples according to this disclosure, the first interface 408 communicates the video data at a faster data rate than the second interface 406A, and the first interface 408 communicates the video data at a faster data rate than the third interface 406B. The second and third interfaces 406A and 406B may comprise one-wire unidirectional interfaces that operate according to a master-slave protocol, and the first interface 408 may comprise a multi-wire differential interface. In other examples, first interface 408, second interface 406A, and third interface 406 may operate at similar speeds (such as according to a common clock), but first interface 408 may be differential and two-directional whereas second interface 406A and third interface 406 may be single-directional (and in some cases second interface 406A and third interface 406 may comprise a single wire).

Figure 5:
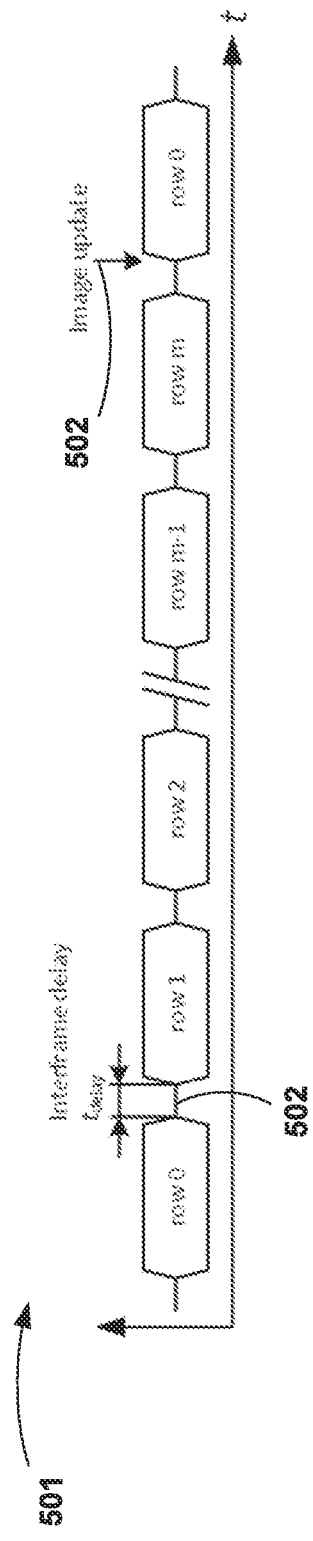
FIG. 5 is a conceptual diagram illustrating an exemplary video data format that may be useful for single ended unidirectional communication of video information.

FIG. 5 is a conceptual diagram illustrating an exemplary video data format that may be useful for single ended unidirectional communication of video information. Video stream 501 may comprise a consecutive stream of single pictures with a given frame rate (e.g. 10 Hz, 15 Hz, 20 Hz, 24 Hz, 30 Hz or 60 Hz). Video stream 501 may conform to a video data protocol used for a low-cost video interface. The video data may be transmitted row-by-row, with an interframe delay 502 encoded between each row. An image update 503 may also be encoded in stream 501 to signal the end of a video frame (the final row of that video frame) and the beginning of the next video frame (the first row of that next video frame. For example, interframe delay 502 and image update 503 may encode information using time delays between data, although bits or flags may also be used. A light source (e.g., LEDs driving by an LED driver) may update its image or bitmap used to drive the LEDs either row by row or once a full image after an entire image is received (e.g., where the image includes m rows).

Figure 6:
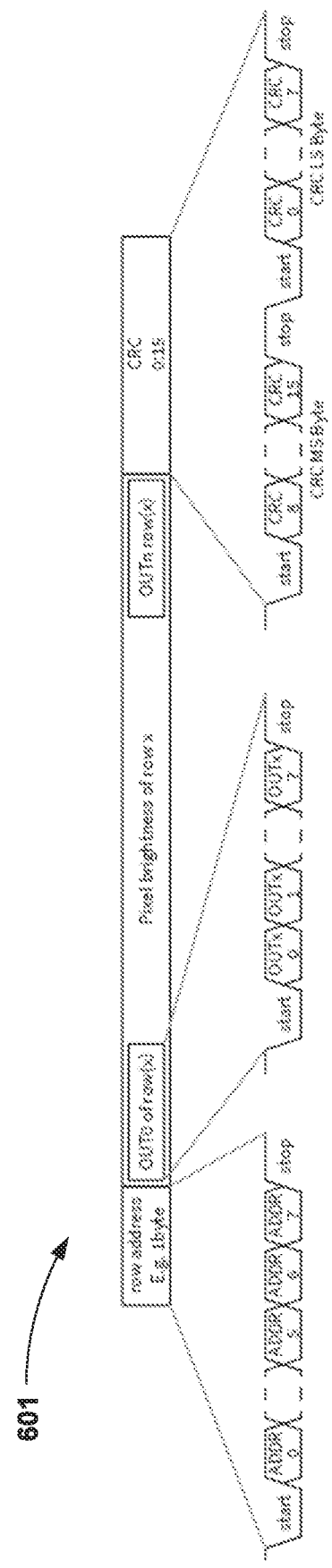
FIG. 6 is a conceptual diagram illustrating an exemplary bitstream for one row of video data.

FIG. 6 is a conceptual diagram illustrating an exemplary bitstream for one row of video data. As illustrated, one row of video information 601 may be communicated using the data fields that include a master break, a row address (e.g., ADDR), pixel brightness data of each individual pixel (e.g., OUTx), and a data integrity check (e.g., CRC). The master break may be optional to signal breaks between rows. For example, a row may comprise one or two bytes that allow the addressing of each individual row. Pixel brightness data may be encoded in n bytes of pixel data for each row (e.g., n=number of pixels per image row*resolution per pixel). As an example, there may be 200 pixels with 8 bits per pixel. Of course, the number of pixels as well as the number of bits used for each pixel could vary widely in different examples. In addition to the pixel data, the video information 601 may also include a data integrity check, such as data that facilitates a cyclic redundancy check (CRC), which may comprise 16 bits CRC data.

In some examples, the data stream may also be encoded with video compression algorithms, such as lossless or lossy encoding. Any of a wide variety of video compression standards may be used, but this may also require encoders and decoders, which may be undesirable for some applications. If compression is used, the compression may correspond to video compression standards or protocols such as: MPEG-2, MPEG-4, ITU-T H.263, ITU-T H.264/MPEG-4, Part 10, Advanced Video Coding (AVC), ITU-T H.265/High Efficiency Video Coding (HEVC), Theora, RealVideo RV40, VP9, AV1, the Versatile Video Coding (VVC) currently under development, and extensions of such standards.

Also, in order to enable higher duty cycle/brightness resolutions with the same transmission speed per pixel an additional look up table can be added for post processing of the transmitted data, which may provide a very low cost way to reduce data without requiring full compression according to a standard. In some cases, entropy coding is applied by the transmitter unit and receiver unit (e.g., 222 and 230 of FIG. 2) associated with a given interface, without encoding compression according to a standard.

Figure 7:
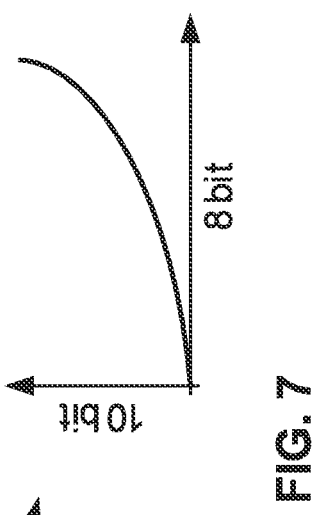
FIG. 7 is a graph showing an exemplary Gamma Correction curve that may be applied by a headlamp control circuit to help compensate LED brightness relative to perceived brightness of the human eye.

FIG. 7 is a graph showing an exemplary Gamma Correction curve 701 that may be applied by a headlamp control circuit to help compensate LED brightness relative to perceived brightness of the human eye. In the example shown in FIG. 7, for each n-bit value, a brightness value with higher resolution is assigned. As the human eye is more sensitive to changes in the low brightness area, more bit values are placed there. Choosing a non-linear shape for encoding 10-bit values into 8-bit values may add an additional Gamma Correction to compensate the LED brightness so as to better account for the perceived brightness of the human eye. The uneven distribution (high coverage at low duty cycle and lower coverage at high duty cycles) of the assigned duty cycle allows a lower data length to be transmitted for each pixel (e.g. 8-bit instead of 10-bit) without significant loss of configurability of the light. As noted above, Gamma corrections may be applied by a GPU, by an LED controller, or by logic of an LED driver.

Furthermore, in order to ensure a valid video data transmission, several data integrity check measures can be embedded in the protocol as well as the protocol handler such as: frame check validating the correct length of received bit stream, CRC or one counter checksums (e.g. at the end of each row) to validate the received data and allow a correction in case of errors within the received data, and watchdog monitoring of any bus or interface timeouts.

A low cost one wire interface may be defined as a point to point communication only, which may not follow other standard protocol definitions such as CAN-protocol. In this way, data overhead can be limited to the row address and the checksums for data validation.

A low cost one wire interface may operate asynchronously and may be based on a universal asynchronous receiver-transmitter (UART) interface. The synchronization to a frame can be done based on the interframe delay and the following start byte of each row that is transmitted. The data itself can be sent in portions or pixels (e.g. 8 bits or 16 bits embedded within a start bit (low) and a stop bit (high)). The row address can be used to synchronize the protocol to a new image. Timing synchronization can be performed using precise clock generators in the signal source and the light source, driver or controller that receives the image. In this case, the signal source and the light source, driver or controller can be sent the same interface operating frequency. On the receiver side, a receiver that receives video data may use sufficient oversampling to compensate for any small frequency deviations. The additional frame check may also be included data stream to ensure that invalid frames caused by wrong frequency settings are ignored.

Figure 8:
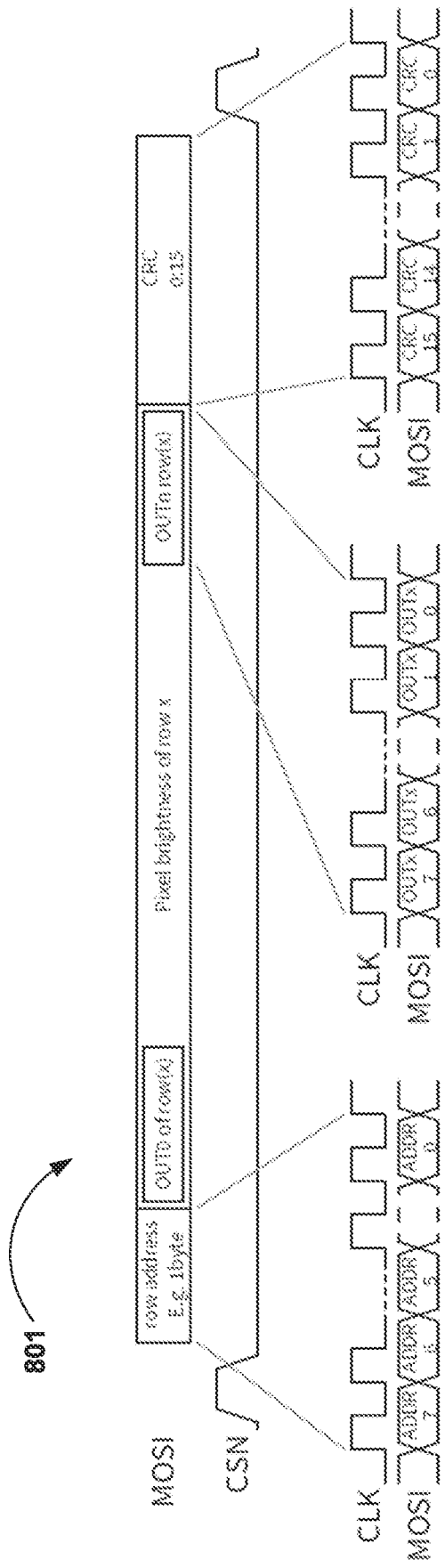
FIG. 8 is another conceptual diagram illustrating an exemplary bitstream for one row of video data, where the video interface also includes a clock line.

FIG. 8 is another conceptual diagram illustrating an exemplary bitstream 801 for one row of video data, where the video interface also includes a clock line. In order to add more robustness and to remove the need for the additional precise oscillator, a low-cost interface unidirectional interface may be extended to include a clock line and optionally also an update line. This type of extension illustrated in FIG. 8 may enable the usage of higher data rates (e.g. up to 25 Mbaud) and may remove the need for precise oscillators on receiver and transmitter side. In FIG. 8, CSN may refer to "Chip select NOT," MOSI may refer to "Master Out Slave In" and MISO may refer to "Master In Slave Out" (which may refer to reverse communication that is not necessarily used for many examples of this disclosure) As shown, for example, a CSN clock signal may be used signal a new row, and CLK clock signals may be used to signal each address (ADDR), pixel brightness data of each individual pixel (OUTx) and CRC data. Additionally, in the example of FIG. 8, no start and stop bits are needed after each 8 bit or 16 bit data field, and for this reason, net bandwidth can be increased. Consistent with FIG. 8, in some examples, a low-cost interface may comprise a multi-wire unidirectional interface, such as a 2-wire, a 3-wire interface, or a 4-wire interface. The unidirectional interface, for example, may include a data line, a clock line, and a chip select line such as a CSN.

Figure 9:
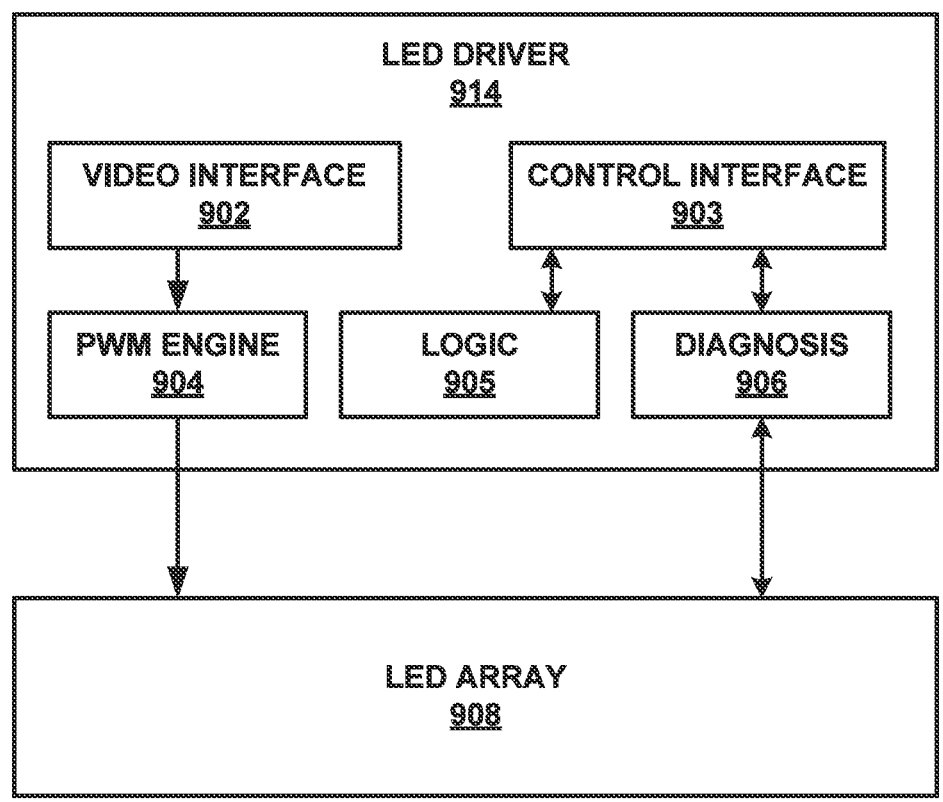
FIG. 9 is a block diagram of an exemplary LED driver for driving an LED array.

FIG. 9 is a block diagram of an exemplary LED driver 914 for driving an LED array 908. LED array 908 may comprise a two-dimensional array of individually controlled pixels and may include several thousand pixels in an application specific integrated circuit (ASIC). LED driver 914 may be supplied with 5 volts (supply not shown). LED driver 914 may comprise one example of other LED drivers described herein, although other types of LED drivers could be used. In the example of FIG. 9, LED driver includes a video interface 902, which may comprise a low-cost interface that is configured to receive video data from another circuit within a vehicle headlamp unit. Video interface may receive video frames (e.g., bit maps) that can be used to drive individual LEDs of LED array 908. In some examples, video interface 902 may receive continuous updates of real-time image data, e.g., at 24, 30, or 60 frames per second. PWM engine 904 may comprise one or more switches that are controlled to regulate current through each LED of LED array 908 so as to adapt the LED brightness according to video data received over video interface 902. The switches may be controlled by pulse width modulation (PWM) signals, although pulse density modulation (PDM) or other types of signal modulations may also be used.

Control interface 903 may perform other controls or adjustments to the video data and the LED array 908. Control interface 903 may comprise a low speed interface that operates at a speed greater than 2 megabits, such as an I2C interface or UART interface. Logic 905 may be included, such as for performing Gamma corrections on video data prior to such data being used by PWM engine 904 to drive LED array 908. In addition, control interface may control diagnosis circuitry 906 in order to monitor LED and circuit conditions, and diagnosis any problems with LED array.

Figure 10:
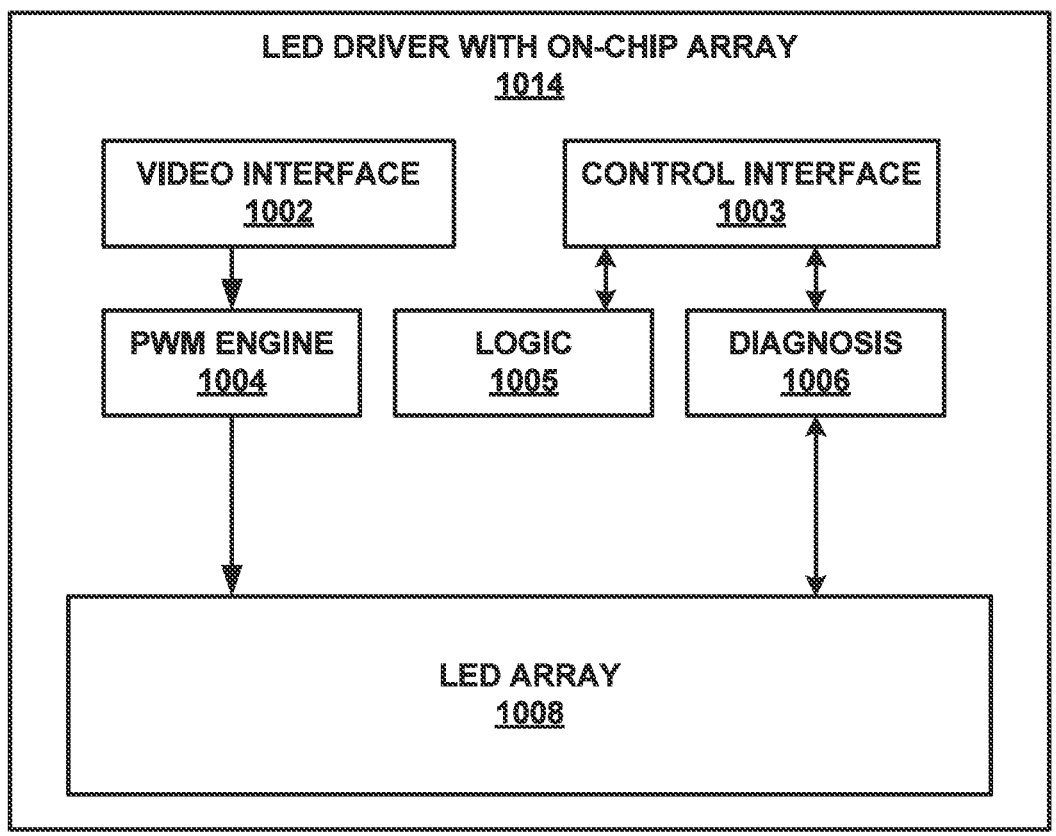
FIG. 10 is a block diagram of an exemplary LED driver that includes an on-chip LED array on the same integrated circuit (i.e., the same "chip") as the LED driver.

FIG. 10 is another block diagram showing an exemplary LED driver 1014 that includes an on-chip LED array 1008 on the same integrated circuit (i.e., the same "chip") as the LED driver. LED driver 1014 is very similar to LED driver 914 shown in FIG. 9. LED array 1008 may be similar to LED array 908. However, in FIG. 10, LED array 1008 is formed on the same integrated circuit as LED driver 1014. Moreover, all of the components shown in LED driver 1014, including LED array 1008, for example, may be formed in the same silicon structure, although other semiconductor materials may also be used, such as Gallium nitride. Otherwise, video interface 1002 may be similar to video interface 902, control interface 1003 may be similar to control interface 903, PWM engine 1004 may be similar to PWM engine 904, logic 1005 may be similar to logic 905, and diagnosis circuit 1006 may be similar to diagnosis circuit 906.

Figure 11:
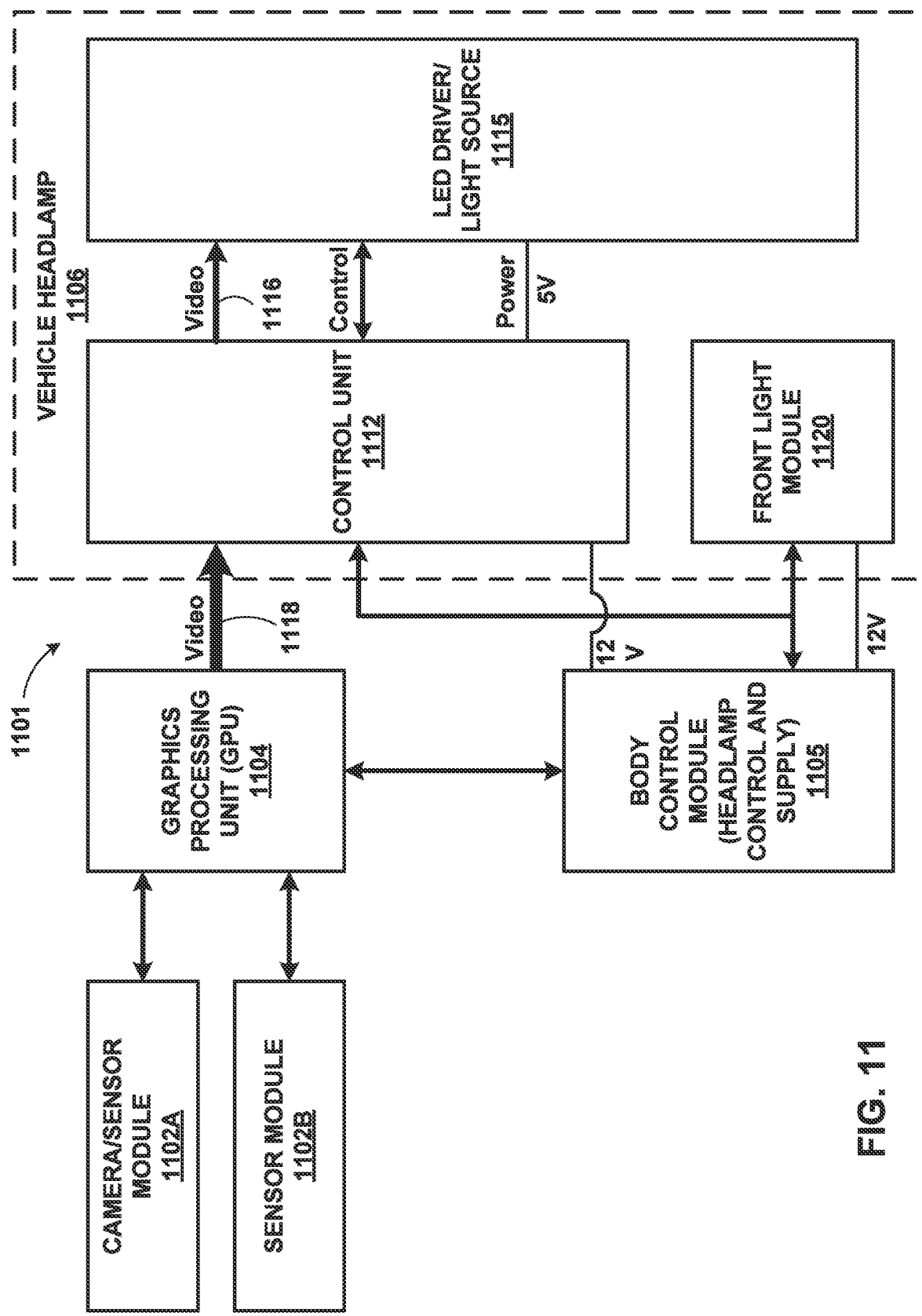
FIG. 11 is an exemplary system block diagram of an example vehicle headlamp system according to this disclosure.

FIG. 11 is an exemplary system block diagram of an example vehicle headlamp system according to this disclosure. In this example, the vehicle headlamp system 1101 includes camera/sensor module 1102A, sensor module 1102B, GPU 1104, body control module 1105, and vehicle headlamp unit 1116. Vehicle headlamp unit may comprise a control unit 1112, which may comprise an LED controller, a front light module 1120, and an LED driver/light source, which may comprise an LED driver that includes an on-chip LED array similar to that shown in FIG. 10.

Camera/sensor module 1102A may be located in the front of a vehicle and may be configured to capture real-time video of an area in front of the vehicle. Sensor module 1102B may generally refer to other cameras or sensors that may be useful for video-aided driving or self-driving of a vehicle. GPU 1104 may be configured to process video data received from camera/sensor module 1102A and to recognize objects in the real-time video, such as oncoming vehicles, road hazards, road lines, road signs, or other objects. A first interface 1118 communicates a processed video stream from GPU 1104 to control unit 1112 within vehicle headlamp 1106. Control unit 1112 may perform further adaption of the video stream to adjust pixel bit maps for use in driving pixels of LED driver/light source 1115. Control unit 1112, for example, may perform Gamma corrections on pixel values (although this could also be performed by an LED driver). Control unit 1112 may also down sample image-based bit maps to a resolution associated with a pixel array within LED driver/light source 1115. In this way, an image-based bit map, which may have been processed by GPU 1104 to adjust pixel values based on object detection, can be downsampled (or possibly upsampled) to create a bitmap with values defined for driving individual pixels within LED driver/light source 1115. Down sampling or upsampling may be needed so that the image-based bit map is adjusted to the same resolution as the pixel array of pixels within LED driver/light source 1115.

Communication between sensor modules 1102 and GPU 1104 may occur via typical automotive interfaces, such as a CAN bus. Body control module 1105 may control other light functions of from light module 1120, such as turn signals, DRLS, hazard lights, or other lighting features. In addition, body control module 1105 may provide main control and 12-volt power supply to vehicle headlamp 1106. Control unit 1112 may use the 12-volt power supply, and control unit 1112 may also level shift the 12 volt supply to a 5-volt supply that is delivered to LED driver/light source 1115. The communication interface between body control module 1105 and front light module 1120 may comprise a CAN bus, such as CAN FD. Moreover, the same CAN bus communication interface between body control module 1105 and front light module 1120 may also be used for communication between body control module 1105 and control unit 1112.

In contrast to first interface 1118, which communicates a processed video stream from GPU 1104 (outside of vehicle headlamp unit 1106) to control unit 1112 (inside of vehicle headlamp 1106), second interface 1116 is configured as a low cost interface that is still configured to provide reliable and effective video data communication between the control unit and LED driver/light source 1115. Second interface 1116 may be needed because of modular design and separation of the different modules. This disclosure appreciates the undesirability of wire routing and high costs associated with a high-speed video cable within vehicle headlamp 1106, and therefore, this disclosure describes a desirable low-cost interface for second interface 1116 that can support pixelated LED light systems that include 10,000-20,000 pixels. Of course, LEDs having a fewer number of pixels or a greater number of pixels can also benefit from the teachings of this disclosure. LED driver/light source 1115, for example, may comprise a matrix of individually controlled LEDs. In some cases, the matrix light source can be mounted on a separate printed circuit board relative to the LED driver due to high power constraints and space constraints, but this can add yet additional interfaces for which the low-cost interfaces described herein may be desirable.

In some examples, the system of FIG. 11 includes a circuit within vehicle headlamp 1106 that is configured to control the vehicle headlamp. The circuit may comprise LEDs and LED driver configured to drive the LEDs based at least in part on the video data (e.g., LED driver and light source 1115). The circuit may also include an LED controller (e.g. control unit 1112) configured to receive video data from a video source (e.g., GPU) via a first interface 1118. The circuit may also include a second interface 1116 between the LED controller (e.g. control unit 1112) and the LED driver (e.g., LED driver and light source 1115), and the second interface may be configured to the video data at a slower data rate than the first interface.

Figure 12:
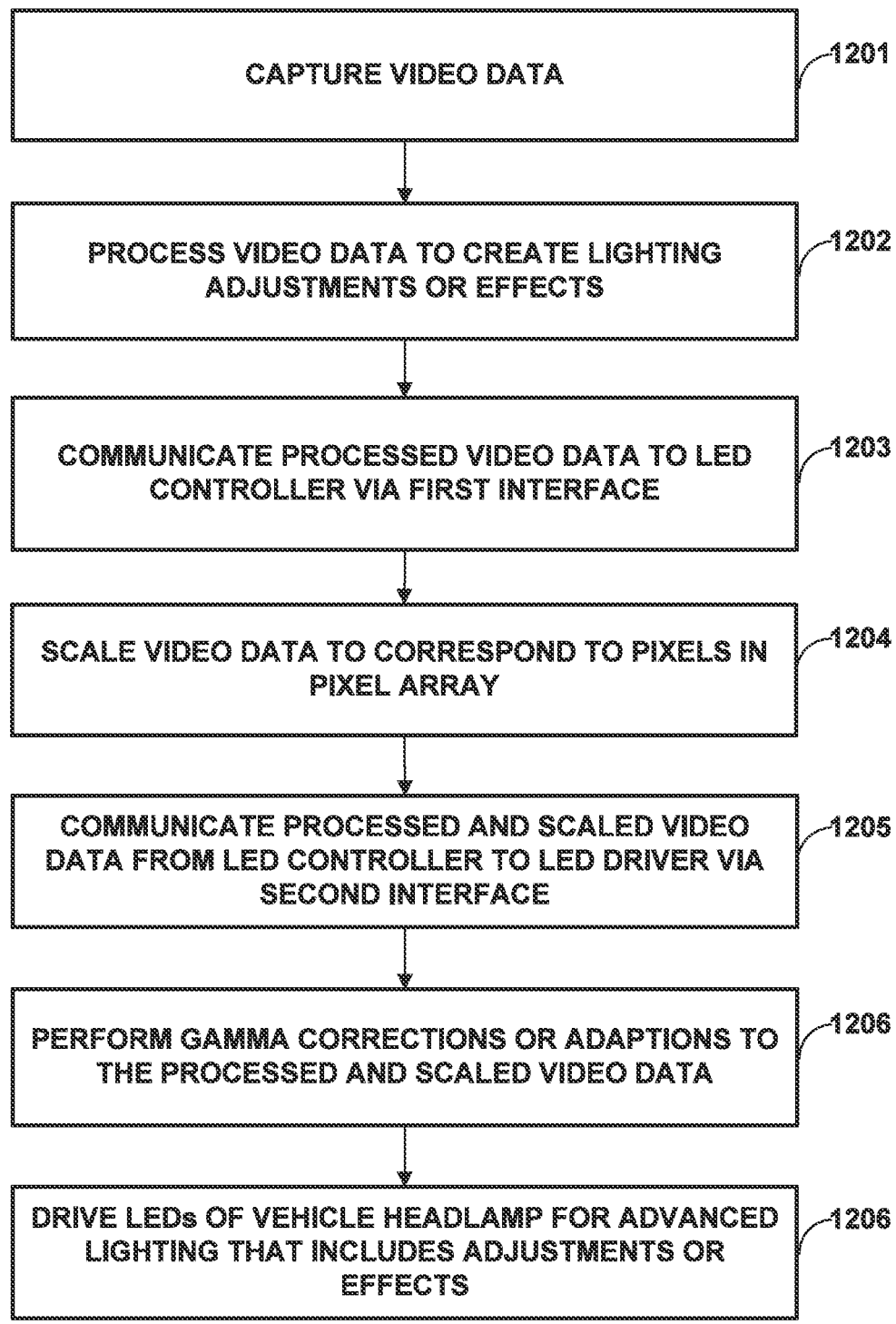
FIG. 12 is a flow diagram consistent with techniques performed by a vehicle according to this disclosure.

FIG. 12 is a flow diagram consistent with techniques performed by vehicle according to this disclosure. FIG. 12 will be described from the perspective of vehicle lighting system 100 of FIG. 1, although other systems could perform the techniques. The steps shown in FIG. 12 are exemplary, and not all steps are required for various examples.

As shown in FIG. 12, camera sensors 102 capture video data, which may comprise real-time video data of the front view of a vehicle (1201). GPU 104 processes the video data to create lighting adjustments or effects (1202). For example, GPU 104 may perform object detection to detect objects in the field of view and to adjust pixel data based on the detected objects. For example, GPU may adjust pixel data in a way that can ultimately achieve glare reductions perceived by the operators of other vehicles, enhance illumination of one or more objects, adjust or project visual aids or guiding elements in order to help the vehicle operator (e.g., to present guiding elements on the road), project one or more symbols, project guiding lines for the vehicle operator (e.g., to present guide lines on the road), shape light projected by the LEDs, reduce light intensity of a portion of light projected by the LEDs, present symbols, present images, present trademarks during vehicle start-up or vehicle idle, or achieve other effects. Such light adjustments may be performed by GPU 104 based on navigation information collected or presented by the vehicle, based on object detection, or based on other factors.

After processing the video data, GPU communicates the processed video data to LED controller 112 via a first interface 118 (1203), which may comprise a high speed video interface, a differential interface, or another high cost interface as discussed herein. LED controller 112 scales the video data to correspond to pixels within a pixel array of LEDs 108 (1204). For example, if the captured and processed image includes 40000 pixels, but the LED array only includes 20000 LEDs, then the 40000 pixel values may be down sampled to 20000 values so that the image can be used as a bit map for driving the 20000 LEDs. Of course, the number of pixels in the images and the number of pixels in the LED array may vary widely for a wide variety of implementations, so the amount of downsampling (or possibly up sampling) could vary widely in different implementations.

The processed and scaled video data is then communicated from LED controller 112 to LED driver 114 via second interface 116 (1205), which may comprise a low-cost interface described herein, such as a one wire interface that operates according to a master slave protocol. In the example process shown in FIG. 12, LED driver 114 performs Gamma corrections or adaptions on the video data (1206), and then LED driver 114 drives LEDs 108 for advanced lighting that includes adjustments or effects (1207), such as those described herein.

Figure 13:
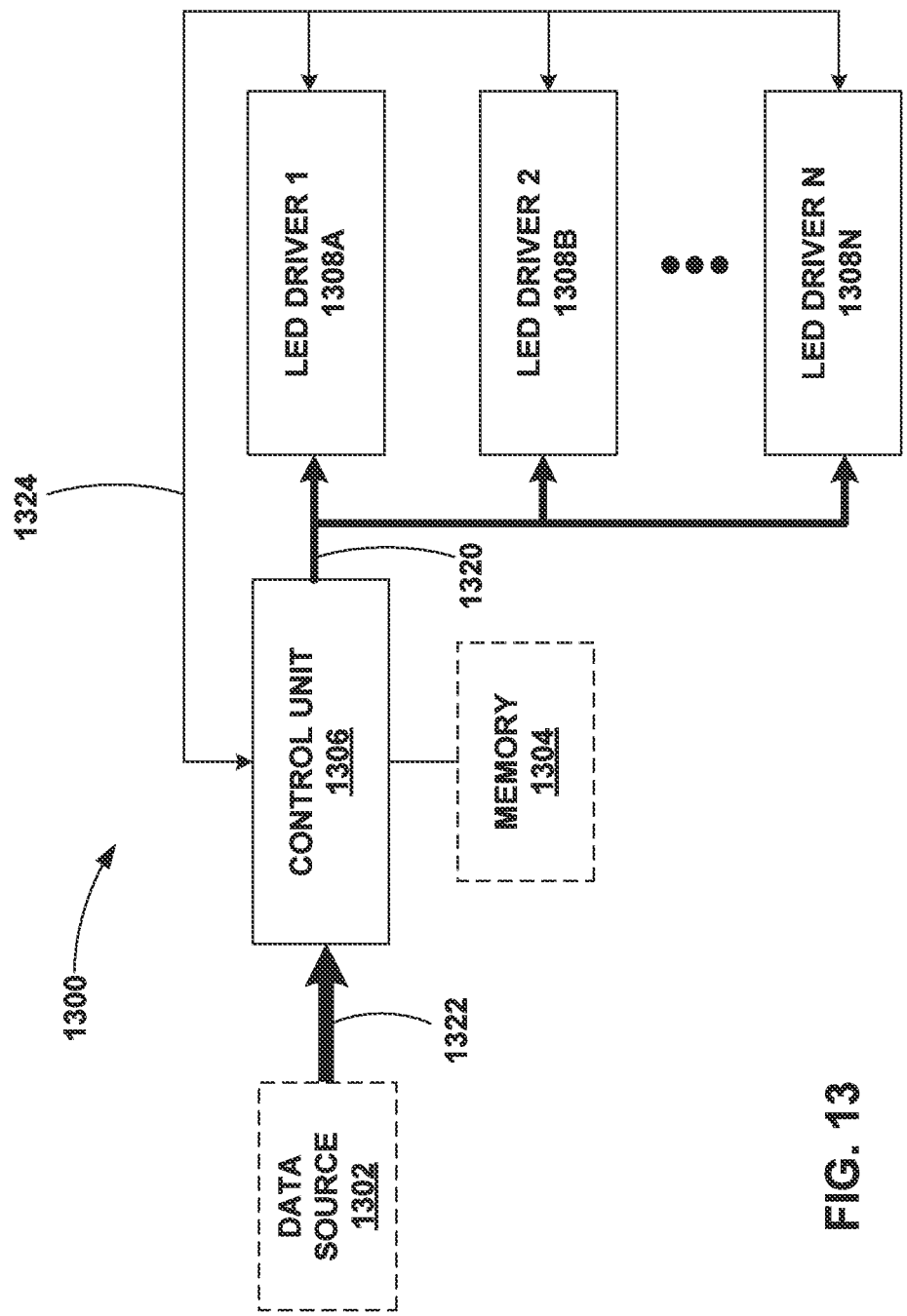
FIG. 13 is a block diagram of a circuit configured to control LEDs consistent with this disclosure.

FIG. 13 is a block diagram of a circuit 1300 configured to control LEDs of a vehicle consistent with this disclosure. Circuit 1300 comprises a control unit 1306 and a plurality of LED drivers 1308A-1308N configured to control N sets of LEDs, where N is any positive integer greater than 1. Control unit 1306 may comprise an LED control circuit (such as a microprocessor) that is configured to generate a multicast of pixel intensity values based on data in memory 1304 or data received from a data source 1306. Data source 1306 may comprise a video source, a graphics processing unit, or possibly another controller or external memory that stores sets of intensity values for various lighting situations. Alternatively or additionally, control unit 1306 may receive pixel intensity values from a memory 1304 that stores sets of intensity values for various lighting situations. In any case, control unit 1306 may be configured to generate a multicast of pixel intensity values, and output the multicast on interface 1320, which may comprise a one-wire unidirectional interface from control unit 1306 to each of LED drivers 1308A-1308N. That is to say, interface 1320 may comprise one wire from control unit 1306 which is connected in parallel to each of LED drivers 1308A-1308N via a signal wire connection to each of LED drivers 1308A-1308N. This may form a one to many connection between control unit 1306 and LED drivers 1308A-1308N. In other examples, if additional bandwidth is desirable, the interface 1320 may comprise a video interface or a multiple wire interface.

LED drivers 1308A-1308N are configured to receive the multicast from control unit 1306 and drive different pluralities of the LEDs based on the multicast. For example, LED drivers 1308A-1308N may correspond to rows, clusters, or other subsets of LEDs within a matrix of LEDs that forms a vehicle headlamp or a portion thereof. In other examples, some or all of LED drivers 1308A-1308N may correspond to different vehicle lights, such as external vehicle lights (e.g., brake lights, driving lights, external aesthetic lights, or other external lights) or internal lights (e.g., dome lights, instrument control lights, aesthetic lights, or other internal lights). In still other examples, LED drivers 1308A-1308N may correspond to both a matrix of LEDs that forms a vehicle headlamp (or a portion thereof) and other vehicle lights, such as external vehicle lights that illuminate from the outside of the vehicle or internal vehicle lights that illuminate inside the vehicle. The control techniques of this disclosure can be used with any sets of LEDs.

Each of LED drivers 1308A-1308N may comprise driver circuits configured to drive a unique set of LEDs within a vehicle. The plurality of LED drivers 1308A-1308N are configured to receive the multicast from control unit 1306 over the one-wire uni-directional interface 1320. Each of the plurality of LED drivers 1308A-1308N is configured to know where its particular driver data resides within the multicast. In some cases, control interface 1324 can be used by control unit 1306 to configure each of LED drivers 1308A-1308N with the location of its driver data within the multicast. In general, control interface 1324 is configured to communicate control signals between the LED control circuit and the plurality of LED driver circuits.

In some examples, each of the plurality of LED drivers 1308A-1308N is configured to drive a respective plurality of LEDs based on the multicast in a manner that is unique relative to other drivers of the plurality of LED drivers 1308A-1308N. However, it is also possible for two or more of LED drivers 1308A-1308N to use some of the same data within the multicast, which can help reduce the amount of data transferred over interface 1320. Additional details of these different scenarios are discussed below.

In some examples, data may be received by control unit 1306 via a first interface 1322. Consistent with examples discussed above, data received via first interface 1322, in some examples, may comprise video data received in a video frame-by-video frame manner. In such examples, data source 1302 may comprise a video source, such as a GPU configured to send frames of video data (that comprise intensity values) over first interface 1322. Accordingly, in some cases, control unit 1306 may be configured to receive video data via first interface 1322 in a video frame-by-video frame manner, and output a multicast via a second interface (e.g., the one-wire unidirectional interface 1320) in a row-by-row manner.

Each of LED drivers 1308A-1308N may comprise a circuit configured to drive a plurality of LEDs. Each of LED drivers 1308A-1308N may receive the multicast of pixel intensity values from control unit 1306 via the one-wire unidirectional interface 1320 and drive a respective plurality of LEDs based on the multicast. In some examples or situations, two or more of LED drivers 1308A-1308N may be configured to drive different sets of LEDs using a same portion of the multicast. In this case, the amount of data sent over interface 1320 can be reduced relative to techniques where the data needs to be sent separately to each of LED drivers 1308A-1308N.

In other examples or situations, two or more of LED drivers 1308A-1308N may be configured to drive different drive sets of LEDs using different portions of the multicast. That is to say, the multicast may include data for different ones of LED drivers 1308A-1308N, and each of LED drivers 1308A-1308N may be configured to know the location of its driver data within the multicast.

Furthermore, in still other examples, control unit 1306 may be configured with multiple output interfaces similar to interface 1320. In such cases, control unit 1306 may generate and send multiple different sets of intensity values to different sets of LED drivers via multiple different interfaces that are similar to interface 1320. In this case, consistent with this disclosure, one or more of the output interfaces from control unit 1306 may output a multicast that includes pixel intensity values for a plurality of different LED drivers. Multiple output interfaces can be used, and some or all of the output interfaces may communicate multicast data for controlling a plurality of LED drivers.

Figure 14:
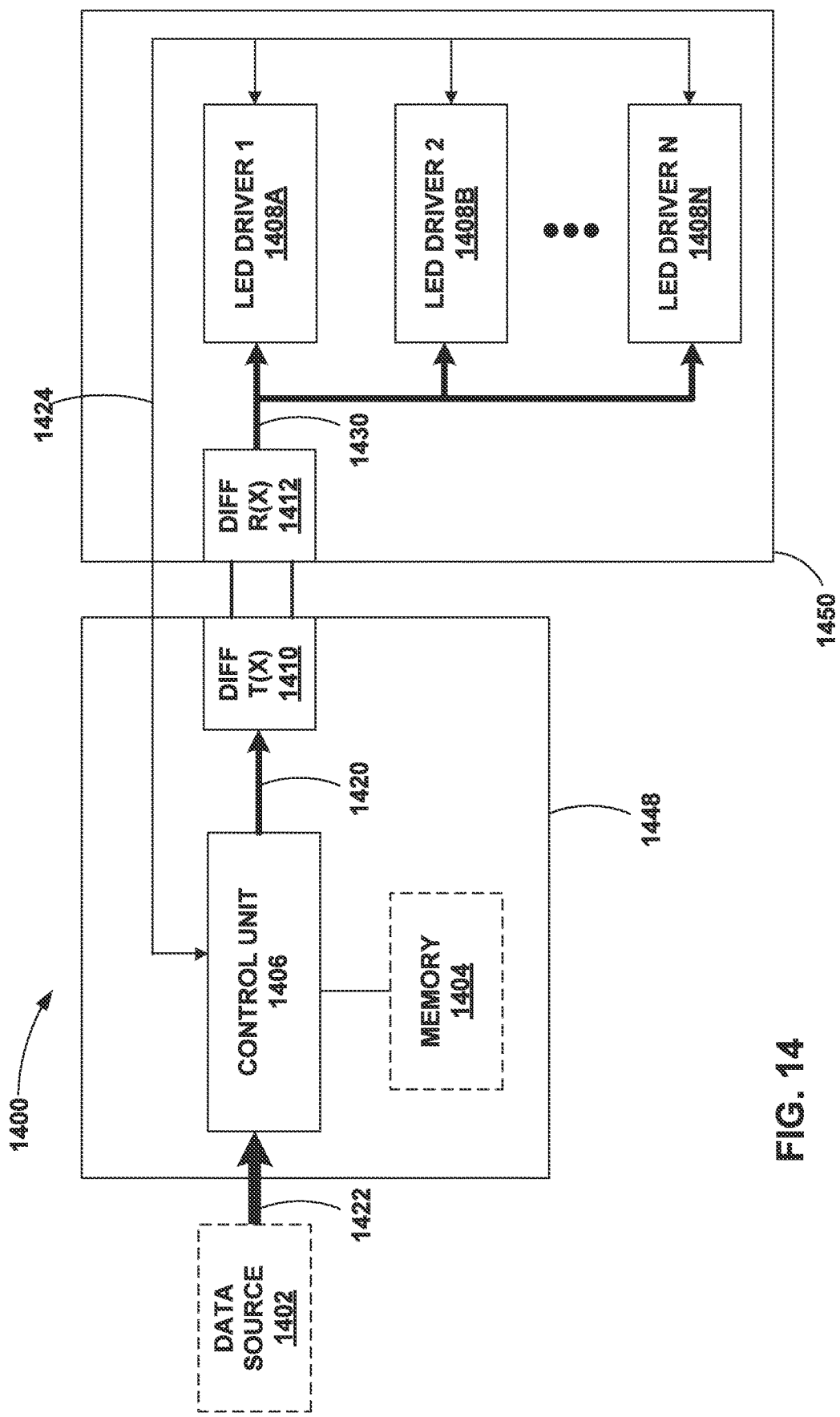
FIG. 14 is a block diagram of another circuit configured to control LEDs consistent with this disclosure.

FIG. 14 is a block diagram of another circuit configured to control LEDs consistent with this disclosure. In the example of FIG. 13, control unit 1306 is directly connected to LED drivers 1308A-1308N via one-wire unidirectional interface 1320. FIG. 14 shows a circuit 1400 that is similar to circuit 1300 in many respects. However, with the example circuit 1400 of FIG. 14, control unit 1406 is positioned on a first module 1448 and LED drivers 1408A-1408N are positioned on a second module 1450. Differential transmitter 1410 of first module 1448 facilitates differential communication (via one wire or multiple wires) to differential receiver 1412 of second module 1450. This arrangement adding differential transmitter 1410 and differential receiver 1412 can facilitate more robust data communication over larger distances within the vehicle. The arrangement of circuit 1300 of FIG. 13 may be more desirable when control unit 1306 and LED drivers 1308A-1308N are located in close proximity within a vehicle (such as within a vehicle headlamp unit), whereas the arrangement of circuit 1400 of FIG. 14 may be more desirable when control unit 1406 and LED drivers 1408A-1408N are located significate distances from each other within a vehicle.

Differential transmitter 1410 is configured to receive a multicast from control unit 1406 via one-wire uni-directional interface 1420 and transmit the multicast as a differential signal on one wire or multiple wires. Differential receiver 1412 is configured to receive the multicast in the differential signal and communicate the multicast directly to LED drivers 1408A-1408N via a one-wire unidirectional interface 1430. In other examples, if additional bandwidth is desirable, the interfaces 1420 and 1430 may comprise a video interface or a multiple wire interface.

In most respects, the components illustrated in circuit 1400 of FIG. 14 may operate similarly to those of circuit 1300 of FIG. 13. That is to say, data source 1402 may be similar to data source 1302, and interface 1422 may be similar to interface 1322. Control unit 1406 may be similar to control unit 1306, and interfaces 1420 and 1430 may be similar to interface 1320. Control interface 1424 may be similar to control interface 1324, and memory 1404 may be similar to memory 1304. Like the example circuit 1300, in circuit 1400, either memory 1404 or data source 1402 may provide the pixel intensity input to control unit 1406, and in some cases, either memory 1404 or data source 1402 is excluded from circuit 1400.

LED drivers 1408A-1408N of circuit 14 are similar to LED drivers 1308A-1308N of circuit 1300. Each of LED drivers 1408A-1408N may comprise a circuit configured to drive a plurality of LEDs. Each of LED drivers 1408A-1408N may receive a multicast of pixel intensity values that are sent by control unit 1406. Each of LED drivers 1408A-1408N may drive a respective plurality of LEDs based on the multicast. In some examples or situations, two or more of LED drivers 1408A-1408N may be configured to drive different sets of LEDs using a same portion of the multicast, and in other examples or situations, two or more of LED drivers 1408A-1408N may be configured to drive different drive sets of LEDs using different portions of the multicast.

Furthermore, in still other examples, control unit 1406 may be configured with multiple output interfaces similar to interface 1420. In such cases, control unit 1406 may generate and send multiple different sets of intensity values to different sets of LED drivers via multiple different interfaces that are similar to interface 1420. In this case, consistent with this disclosure, one or more of the output interfaces from control unit 1406 may output a multicast that includes pixel intensity values for a plurality of different LED drivers. Multiple output interfaces can be used, and some or all of the output interfaces may communicate multicast data for controlling a plurality of LED drivers.

Figure 15:
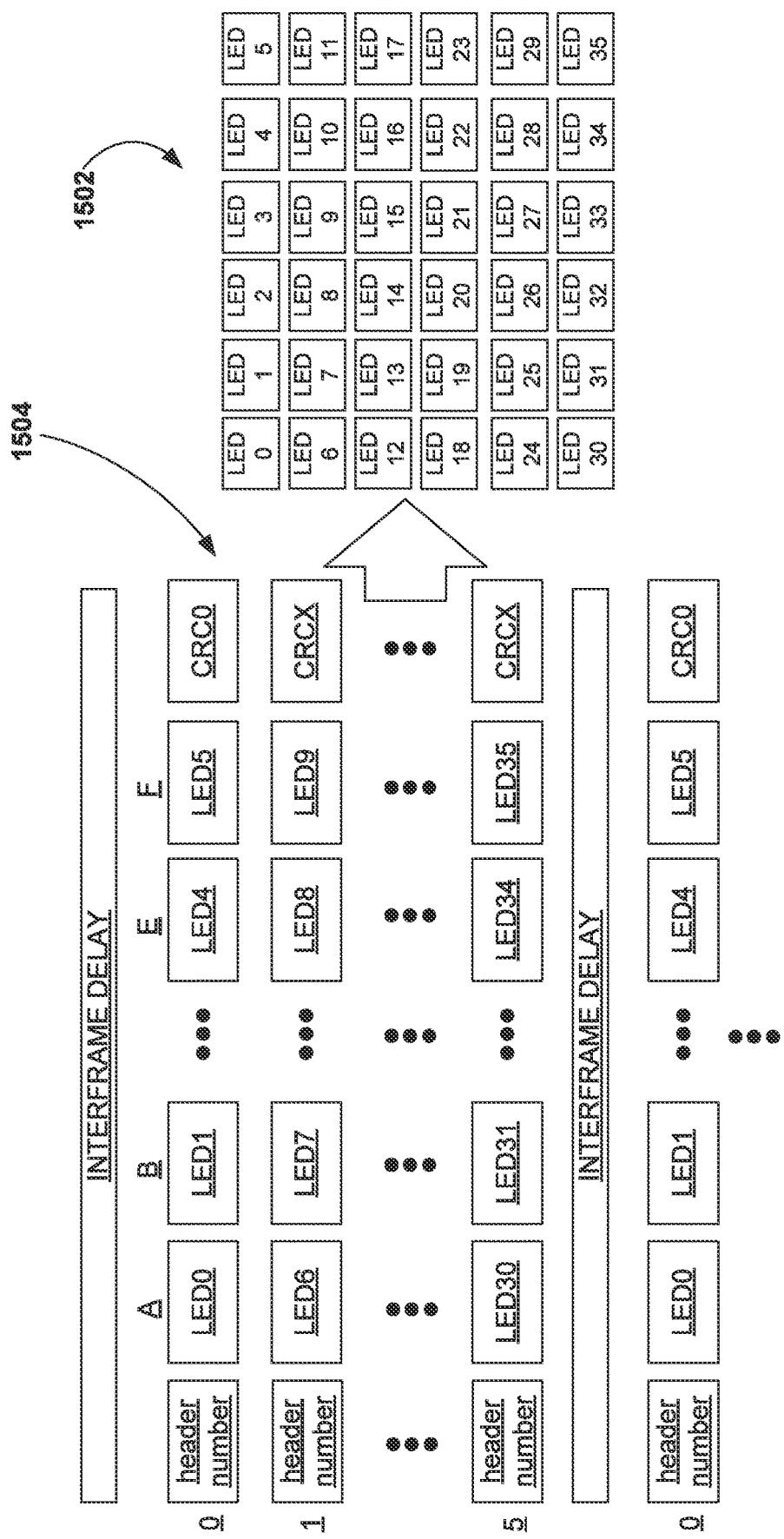
FIG. 15 is a conceptual diagram showing a row-by-row data format that may be applied to LEDs arranged in rows.

FIG. 15 is a conceptual diagram showing a row-by-row data format that may be applied to LEDs arranged in rows. That data may also comprise frames separated by interframe delay, as shown. Each frame may comprise rows of data that are formatted with a header number, a plurality of pixel intensity values (shown as LEDx, where x is an integer from 1-35 in the example of FIG. 15). In this example, there are five rows for each frame, and six pixel intensity values per row. Each row also includes a cyclical redundancy check (CRC) code, as shown in FIG. 15. Of course, FIG. 15 is merely one example, and there could be any number of rows and any number of pixel intensity values per row. Each row may have the same number of pixel intensity values as other rows, or different rows may be configured with different numbers of pixel intensity values. Data could also be arranged in columns or in other ways within a multicast.

In some cases, each of the rows may correspond to one driver. In some cases, multiple rows or portions or rows may correspond to given driver. In some cases, one or more rows or portions thereof may correspond to multiple drivers. The drivers may be configured in many ways to use different portions of data (or possibly the same portions of data) from one or more rows.

In one very basic example consistent with FIG. 15, a set of LEDs 1502 may be arranged in rows, and each row of LEDs 1502 may be driven using the corresponding pixel intensity values in each row of data 1504. Each row of data may be used by a different driver, and each row of LEDs within LEDs 1502 may have an associated driver. Of course, drivers could also be configured to drive multiple rows, or to drive different clusters or LEDs or sets of LEDs. And in some cases, data from one or more rows may be used by multiple drivers to drive different sets of LEDs simultaneously, in a similar manner, such as for illuminating objects, shapes, images, or lighting effects in specific lights (such as brake lights). FIG. 15 is a simple example merely for demonstration purposes. The multicast control of this disclose is very flexible and can be adapted for a wide variety of different lighting controls and situation. Data within a multicast could also be arranged in columns, clusters, or other ways, as long as each of the driver circuits are properly configured to know where to locate the correct pixel values within the multicast. In some cases, a logical arrangement of data in rows may correspond to a physical arrangement of LEDs in rows, columns, clusters, or other groups.

Figure 16:
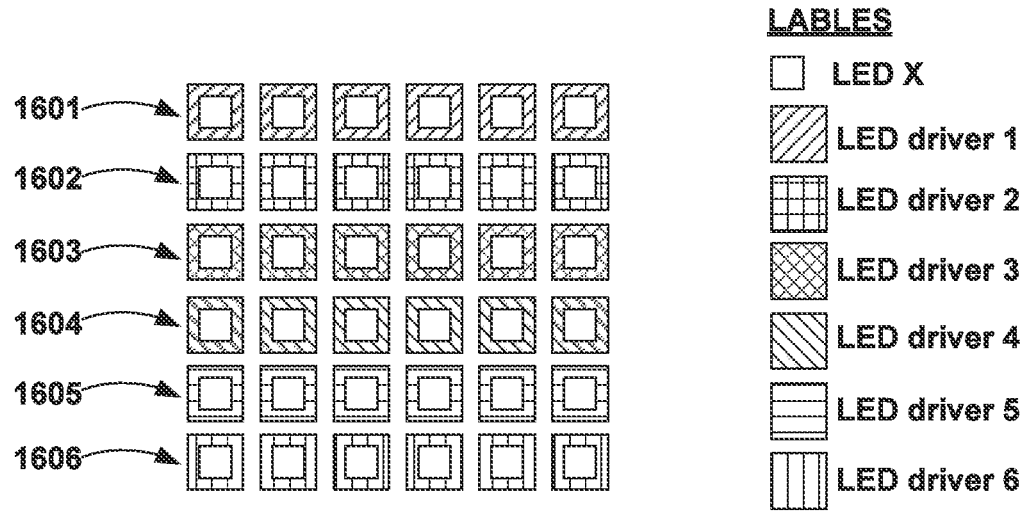
FIG. 16 is a conceptual diagram showing LEDs arranged in rows, with different drivers driving each of the rows.

FIG. 16 is a conceptual diagram showing LEDs arranged in rows, with different drivers driving each of the rows. In particular, LEDs may be arranged such that row 1601 corresponds to a first LED driver, row 1602 corresponds to a second LED driver, row 1603 corresponds to a third LED driver, row 1604 corresponds to a fourth LED driver, row 1605 corresponds to a fifth LED driver, and row 1606 corresponds to a sixth LED driver. In some examples, the different rows of LEDs shown in FIG. 16 may be driven by different drivers that apply the pixel intensity values in corresponding rows of pixel values shown in FIG. 15. Of course, FIG. 16 is an example and there could be more or fewer LEDs in any given row, and the LEDs may be arranged in a variety of ways. In some examples, at least some of the rows of data (like that shown in FIG. 15) may correspond to rows of LEDs (like that shown in FIG. 16) and the rows of LEDs shown in FIG. 16 may be LEDs within a matrix of LEDs that are driven by a plurality of driver circuits based on a multicast as described herein.

Figure 17:
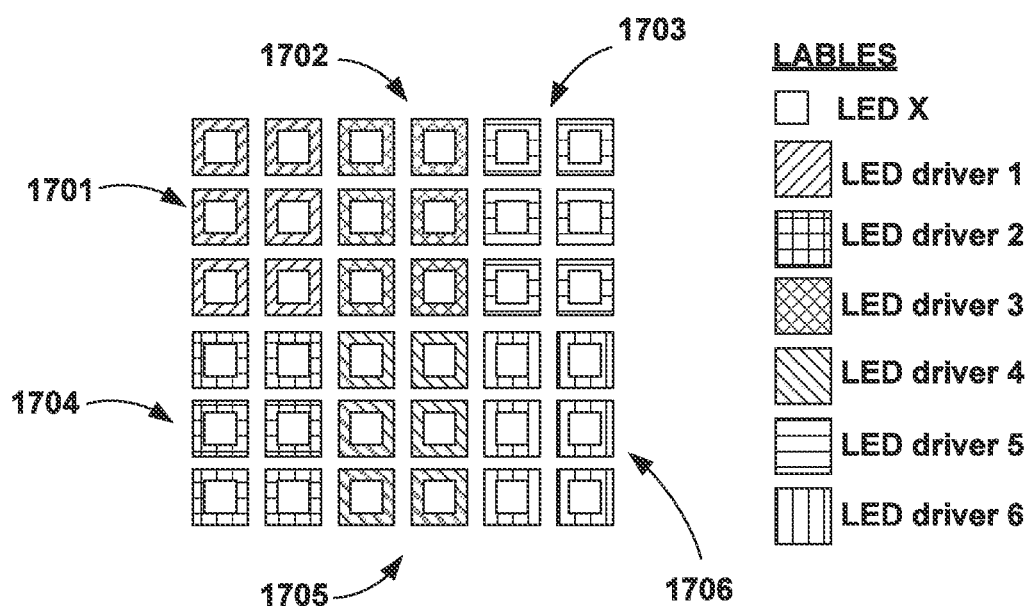
FIG. 17 is conceptual diagram showing LEDs arranged in clusters, with different drivers driving each of the clusters.

FIG. 17 is conceptual diagram showing LEDs arranged in clusters, with different drivers driving each of the clusters. In particular, LEDs may be arranged such that cluster 1701 corresponds to a first LED driver, cluster 1702 corresponds to a second LED driver, cluster 1703 corresponds to a third LED driver, cluster 1704 corresponds to a fourth LED driver, cluster 1705 corresponds to a fifth LED driver, and cluster 1706 corresponds to a sixth LED driver. In some examples, the different clusters of LEDs shown in FIG. 17 may be driven by different drivers that apply the pixel intensity values in rows of pixel values shown in FIG. 15. In some examples, the different clusters of LEDs shown in FIG. 17 may be driven by different drivers that apply the pixel intensity values from corresponding pixels in different rows of pixel values shown in FIG. 15. Each of the drivers for the clusters may be configured to know where its pixel intensity values reside within the multicast, and the mapping of sets of pixel intensity values in the multicast to specific drivers may be defined in many different ways. As with other examples, FIG. 17 is merely one example and there could be more or fewer LEDs in any given cluster, and the LEDs may be arranged in a variety of different types of clusters, e.g., to form shapes, patters, a matrix, or any desirable LED arrangement. In some examples, at least some of the rows of data (like that shown in FIG. 15) may correspond to clusters of LEDs (like that shown in FIG. 17). The clusters of LEDs shown in FIG. 17 may be LEDs within a matrix of LEDs that are driven by a plurality of driver circuits based on a multicast as described herein, or the clusters may comprise LEDs for other lighting applications, such as internal or external lighting. In some cases, clusters of LEDs may be especially useful to create brake lighting effects or running light effects in a vehicle.

Figure 18:
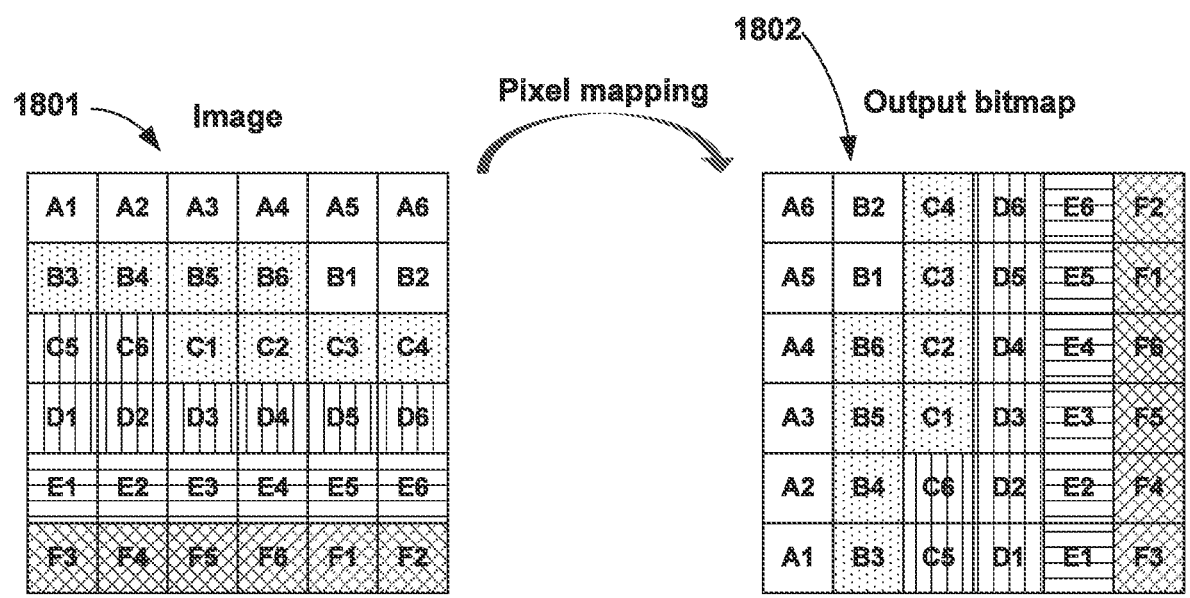
FIG. 18 is a conceptual diagram showing pixel rearranging that may be performed by a control unit to create a multicast of pixel intensity values mapped to LED drivers.

FIG. 18 s a conceptual diagram showing pixel rearranging that may be performed by a control unit to create a multicast of pixel intensity values mapped to LED drivers. In this case, a control circuit (e.g., control unit 1306 or control unit 1406) may be configured to generate the multicast that can be viewed as an output bitmap 1802. To do so, control unit 1306 or control unit 1406 may use pixel reordering or another type of pixel mapping that is based on data in an image 1801. Image 1801 may comprise data a memory (1304 or 1404), which may be used to define a specific light function. Alternatively, image 1801 may comprise data received from a data source (1302 or 1402), in which case the data may define a specific light function or may comprise adaptable lighting data, that is possibly based on data collected by camera sensors as explained in greater detail above. The pixel reordering shown in FIG. 18 may be referred to as warping, but pixel reordering could also be performed in other ways. In general, pixel reordering can be used by control unit 1306 or control unit 1406 to map pixel values in an image or other data set to the proper location within an output bitmap 1802 so that the output bitmap can define a multicast and each respective driver can identify its LED data in a defined location within output bitmap 1802.

Figure 19:
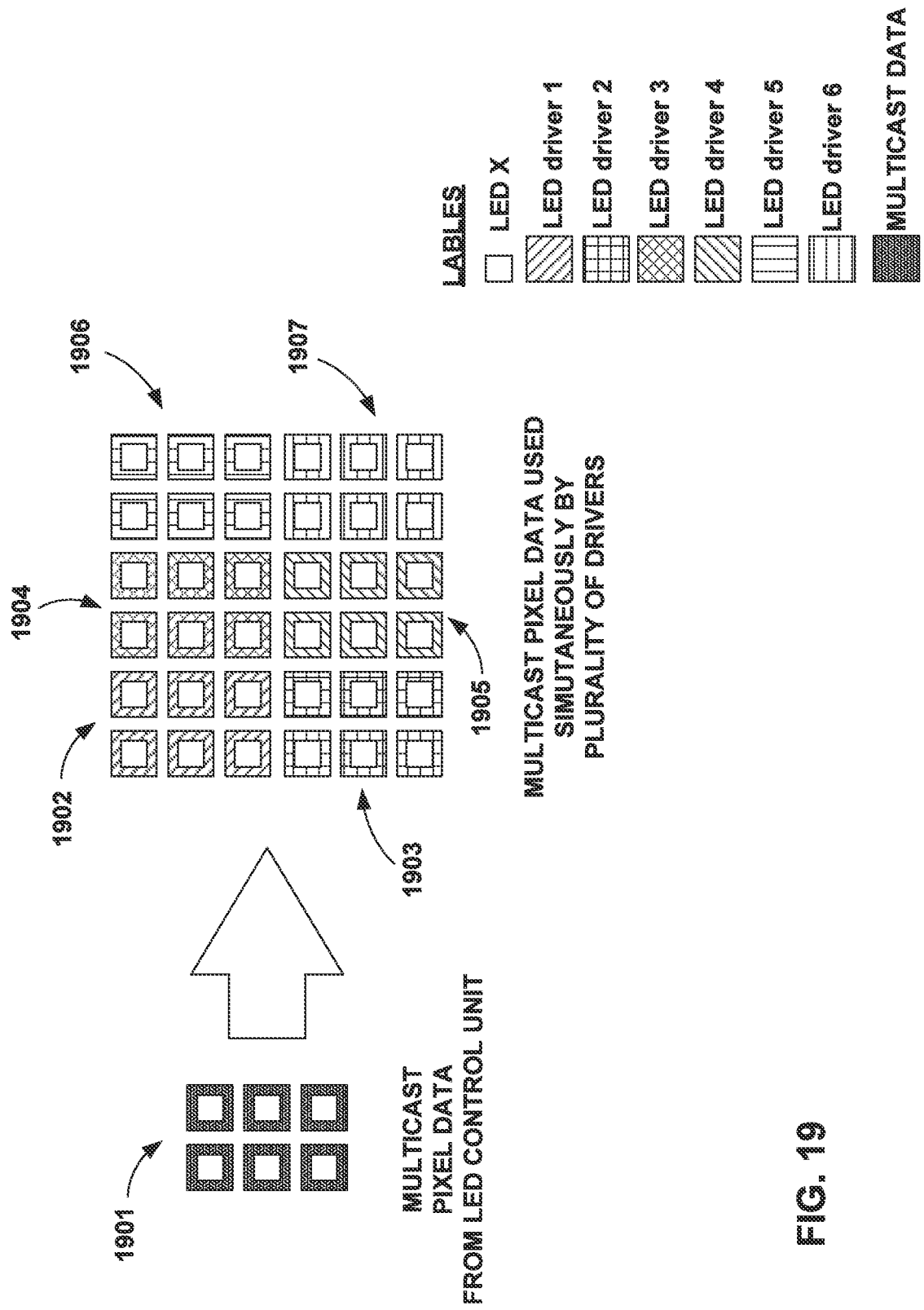
FIG. 19 is a conceptual diagram showing multicast data that may be used by a simultaneously by plurality of different LED drivers.

FIG. 19 is a conceptual diagram showing some multicast data 1901 that may be used by a simultaneously by plurality of different LED drivers. In this example, multicast data 1901 may be received and used by six different LED drivers that are each configured to drive a different cluster of LEDs. LEDs may be arranged such that cluster 1902 corresponds to a first LED driver, cluster 1903 corresponds to a second LED driver, cluster 1904 corresponds to a third LED driver, cluster 1905 corresponds to a fourth LED driver, cluster 1906 corresponds to a fifth LED driver, and cluster 1907 corresponds to a sixth LED driver. The same multicast data 1901 is used to drive each of clusters 1902-1907 using different drivers. Each of the drivers receives the same multicast data and each of the drivers is configured to know that the multicast data is for that driver. By facilitating a set of the pixel intensity values in multicast data 1901 that is configured to be used simultaneously by two or more of the plurality of LED drivers, the amount of data that is sent from a control circuit (e.g., control unit 1306 or control unit 1406) to the drivers (e.g., drivers 1308 or 1408) may be reduced. Moreover, by using multiple drivers to drive different clusters of LEDs simultaneously, in a similar manner, using the same multicast data 1901, may be very useful for illuminating or displaying objects, shapes, images, or lighting effects in specific lights (such as brake lights or brake light effects) in a vehicle.

Figure 20:
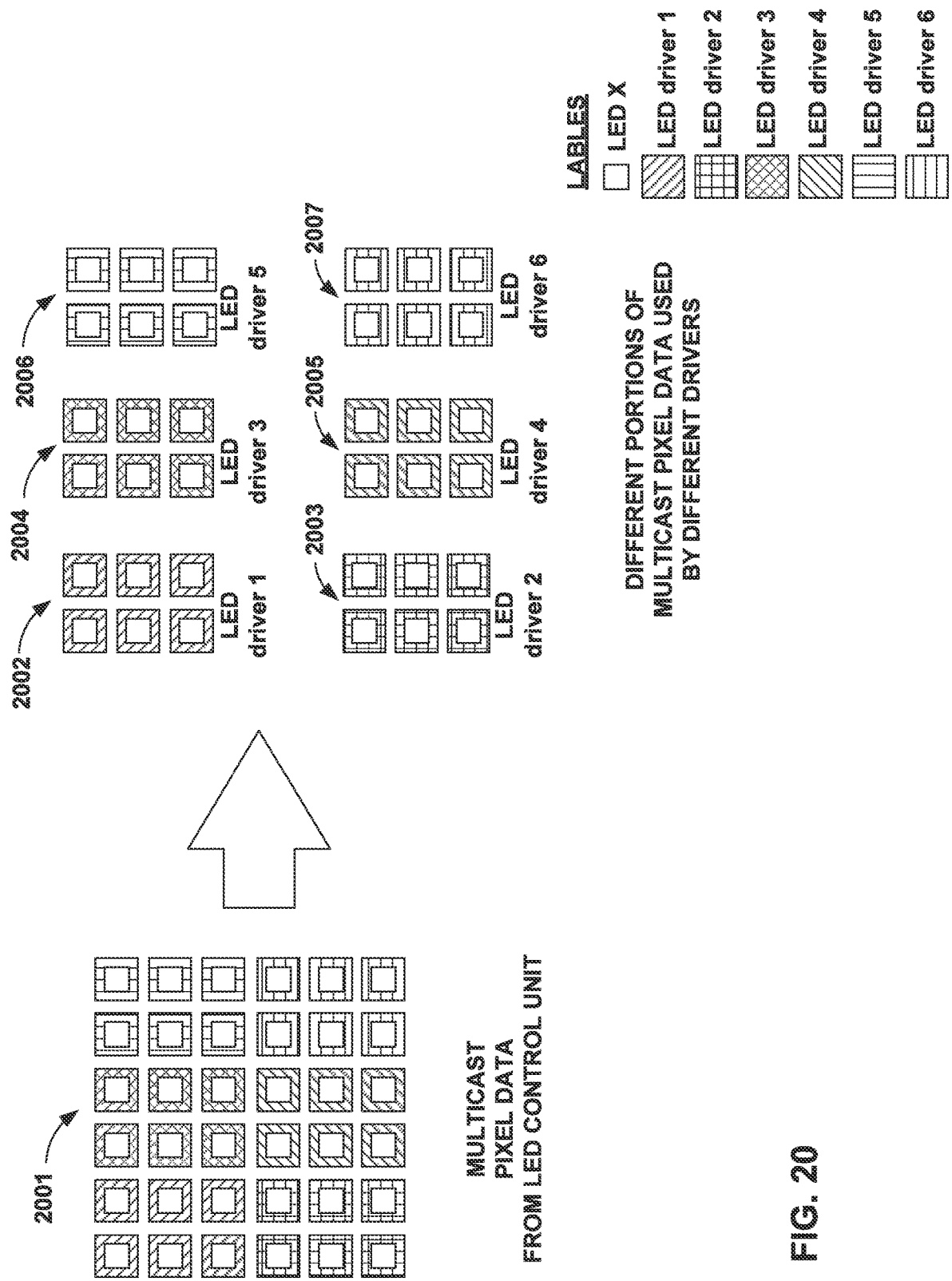
FIG. 20 is a conceptual diagram showing multicast data that includes different sets of data that can be identified in the multicast and used separately by a plurality of different LED drivers.

FIG. 20 is a conceptual diagram showing multicast data that includes different sets of data that can be identified in the multicast and used separately by a plurality of different LED drivers. In this example, multicast data 2001 comprises different sets of data that corresponds to different clusters of LEDs. LEDs may be arranged such that cluster 2002 corresponds to a first LED driver, cluster 2003 corresponds to a second LED driver, cluster 2004 corresponds to a third LED driver, cluster 2005 corresponds to a fourth LED driver, cluster 2006 corresponds to a fifth LED driver, and cluster 2007 corresponds to a sixth LED driver. The same multicast data 2001 is received by different drivers associated with clusters 2002-2007, however, each driver uses a unique portion of multicast data 2001 to drive its respective cluster. Each of the drivers receives the same multicast data and each of the drivers is configured to know where its data resides within the multicast.

In the example of FIG. 20, multicast data 2001 comprises different sets of the pixel intensity values that are defined for use by different ones of a plurality of LED drivers. Each of the plurality of LED drivers may be associated with one of clusters 2001-2006 of LEDs shown in FIG. 20. The pixel intensity values that are defined for a first LED driver associated with cluster 2002 may be different than the pixel intensity values that are defined for a second LED driver associated with cluster 2003. The different clusters may correspond to different portions of a matrix of LEDs that form a headlamp and/or different clusters may correspond to different lighting (possibly with on or more clusters corresponding to interior vehicle lighting and one or more clusters corresponding to exterior vehicle lighting). In still other examples, multicast data similar to that shown in FIG. 19 can be used with multicast data similar to that shown in FIG. 20. In this case, some of the multicast data may comprises a first set of the pixel intensity values (like multicast data 1901) that is configured to be used simultaneously by two or more of the plurality of LED drivers and the multicast data may also comprise a plurality of second sets of the pixel intensity values (like multicast data 2001) that are defined for use by different ones of the plurality of LED drivers.

In some cases, LED drivers may be configured to receive a multicast comprising a first set of pixel intensity values that is used simultaneously by a given LED driver circuit and one or more additional LED driver circuits. Additionally or alternatively, LED drivers may be configured to receive a multicast that comprises s second sets of pixel intensity values that are defined for a plurality of different LED drivers. A given LED driver circuit may be configured to identify one or more of the second sets of pixel intensity values within the multicast and drive a given plurality of LEDs based on the one or more identified sets of pixel intensity values.

Figure 21:
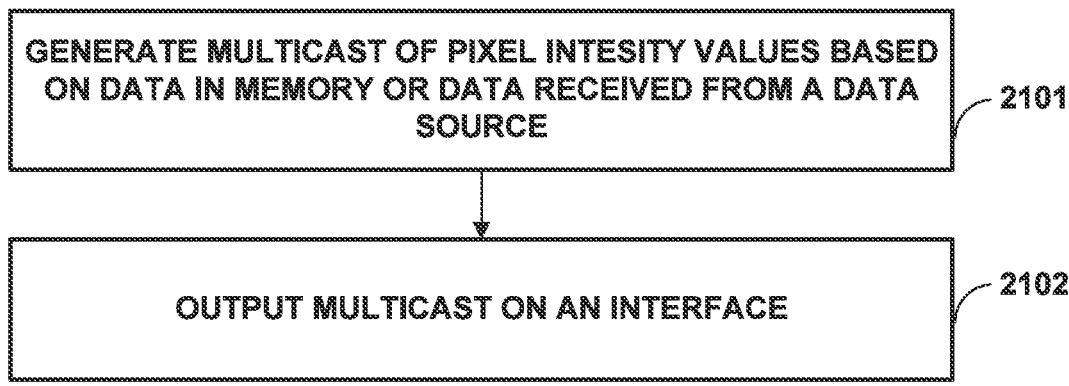
FIGS. 21 and 22 are flow diagrams consistent with some techniques of this disclosure.

FIG. 21 is a flow diagram showing a method of controlling LEDs of a vehicle according to this disclosure. The method of FIG. 21 may be performed by a control unit according to disclosure. For example, the control unit may comprise an LED control circuit, such as a microprocessor configured to send a multicast for controlling a plurality of LED drivers. As shown in FIG. 21, control unit 1306, 1406 generates a multicast of pixel intensity values based on data in memory 1304, 1404 or data received from a data source 1302, 1402 (2101), and outputs the multicast on an interface 1320, 1420, which may comprise a one-wire uni-directional interface (2102). Various examples of the input data to control unit 1306, 1406 and the output data from control unit 1306, 1406 are described above. Also, a number of examples of the data format of the multicast and various possible configurations of drivers is also described above. The method of FIG. 21 may implement any of the examples described herein.

Figure 22:
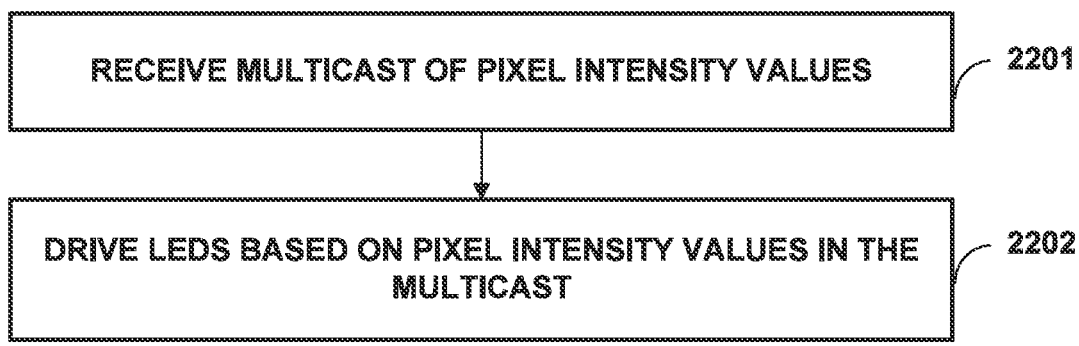

FIG. 22 is a flow diagram showing a method of controlling LEDs of a vehicle according to this disclosure. The method of FIG. 21 may be performed by a driver circuit, which may comprise a driver for one set of LEDs or may comprise a plurality of drivers for a plurality of LEDs. The method of FIG. 22 may be performed by any of the drivers disclosed herein or by another type of circuit or device. FIG. 22 will be described from the perspective of LED drivers 1308A-1308N (collectively drivers 1308) of FIG. 13 or LED drivers 1408A-1408N (collectively drivers 1408) of FIG. 14. However, other drivers described herein or other types of LED driver circuits could also apply the method of FIG. 22.

As shown, two or more of plurality of LED drivers 1308, 1408 receive a multicast of pixel intensity values via an interface 1320, 1430, which may comprise a one-wire uni-directional interface (2201). The LED drivers 1308, 1408 then drive LEDs based on the multicast (2202). Various examples of the input data to control unit 1306, 1406 and the output data from control unit 1306, 1406 are described above. Also, a number of examples of the data format of the multicast and various possible configurations of drivers is also described above. The method of FIG. 22 may implement any of the examples described herein.

Referring back to FIG. 1, it should be appreciated that the use of LED driver control using a multicast as shown and described in FIGS. 13-22 can be applied to any of the systems described herein, including for example, system 100 shown in FIG. 1. A vehicle lighting system may comprise LEDs 108 as shown in FIG. 1, and a circuit configured to control the LEDs 110. In some examples, rather that implement LED controller 112 and a single LED driver 114, vehicle headlamp control circuit 110 may implement some or all of circuit 1300 of FIG. 13 or circuit 1400 of FIG. 14. In this case, LED vehicle headlamp control circuit 110 may comprise LED controller 112 that is configured to control a plurality of LED drivers (i.e., a plurality of units 114). In such a case, controller 112 may be configured to generate a multicast of pixel intensity values based on data in memory (not shown in FIG. 1) or data received from a data source (such as GPU 104 of FIG. 1). LED controller 112 may output the multicast on an interface 116, wherein interface 116 comprises a one-wire uni-directional interface as described herein. In this case, the plurality of LED driver circuits (e.g., a plurality of drivers similar to LED driver 114 of FIG. 1) may be configured to receive the multicast and drive different pluralities of the LEDs 108 based on the multicast.

Any of the circuits described herein may be used with any motorized or non-motorized vehicle that includes an LED headlamp or other LED lighting for interior lighting, exterior lighting, or lighting effects. Vehicles may include cars, trucks, electric vehicles, heavy machinery, motorcycles, bicycles, scooters, watercrafts, recreational vehicles (RVs), all-terrain vehicles (ATVs), utility terrain vehicles (UTVs), golf carts, snowmobiles, self-driving vehicles, or any other type of motorized or non-motorized vehicle that includes LEDs.

The following examples may illustrate one or more aspects of the disclosure.

Example 1—A circuit configured to control a vehicle headlamp comprising light emitting diodes (LEDs), the circuit comprising: an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface.

Example 2—The circuit of example 1, wherein the LEDs comprise a matrix of individually controlled LEDs and wherein the LED driver is configured to control the intensity of different ones of the individually controlled LEDs based on the video data.

Example 3—The circuit of example 1 or 2, wherein the video data is real-time video data associated with a scene illuminated by the LEDs.

Example 4—The circuit of any of examples 1-3, wherein the video data received from the video source comprises processed video data that is based on raw video data and object detection.

Example 5—The circuit of any of examples 1-4, wherein the second interface comprises a one-wire uni-directional interface.

Example 6—The circuit of any of examples 1-5, wherein the first interface comprises a multi-wire differential interface.

Example 7—The circuit of any of examples 1-6, wherein the first interface communicates data video frame-by-video frame and the second interface communicates data row-by-row.

Example 8—The circuit of any of examples 1-7, wherein the LED driver is configured to adjust the video data and the LED driver is configured to drive the LEDs based at least in part on the adjusted video data.

Example 9—The circuit of any of examples 1-8, wherein the LED controller is configured to adjust the video data by performing a Gamma Correction process on the video data.

Example 10—The circuit of any of examples 1-8, wherein the LED driver is configured to perform a Gamma Correction process on the video data.

Example 11—The circuit of any of examples 1-10, wherein the first interface comprises one of: an ethernet interface; a gigabit multimedia serial link (GMSL) interface; a controller area network (CAN) bus interface; a controller area network-flexible data (CAN-FD) bus interface; an interface defined according to a FlexRay protocol; a link defined according to a low voltage differential signaling (LVDS) standard; and a controller area network-extra-large (CAN-XL) bus interface, and wherein the second interface comprises an interface that operates according to a master-slave protocol.

Example 12—The circuit of any of examples 1-11, wherein the first interface comprises a bi-directional interface.

Example 13—A headlamp unit for a vehicle, the headlamp unit comprising: a set of LEDs; and a circuit configured to control the LEDs, the circuit comprising: an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface.

Example 14—The headlamp unit of example 13, wherein the LEDs comprise a matrix of individually controlled LEDs and wherein the LED driver is configured to control the intensity of different ones of the individually controlled LEDs based on the video data.

Example 15—The headlamp unit of example 13 or 14, wherein the video data received from the video source comprises processed video data that is based on raw video data and object detection.

Example 16—The headlamp unit of any of examples 13-15, wherein the second interface comprises a one-wire uni-directional interface.

Example 17—The headlamp unit of any of examples 13-16, wherein the first interface comprises a multi-wire differential interface.

Example 18—The headlamp unit of any of examples 13-17, wherein the LED driver is configured to adjust the video data and the LED driver is configured to drive the LEDs based at least in part on the adjusted video data.

Example 19—The headlamp unit of any of examples 13-18, wherein the LED driver is configured to perform a Gamma Correction process on the video data.

Example 20—The headlamp unit of any of examples 13-19, wherein the first interface comprises one of: an ethernet interface; a GMSL interface; a CAN bus interface; a CAN-FD bus interface; an interface defined according to a FlexRay protocol; a link defined according to a LVDS standard; and a CAN-XL bus interface, and wherein the second interface comprises an interface that operates according to a master-slave protocol.

Example 21—An adaptive vehicle lighting system comprising: one or more camera sensors configured to capture video data associated with a scene illuminated by the vehicle lighting system; a GPU that processes the video data; a first interface; and a headlamp unit comprising: a set of LEDs; and a circuit configured to control the LEDs, the circuit comprising: an LED controller configured to receive the processed video data from the GPU via the first interface; an LED driver configured to drive the LEDs based at least in part on the processed video data; and a second interface between the LED controller and the LED driver, wherein the second interface is configured to communicate the processed video data from the LED controller to the LED driver and wherein the second interface communicates at a slower data rate than the first interface.

Example 22—The system of example 21, wherein the LED driver is configured to adjust the processed video data and the LED driver is configured to drive the LEDs based at least in part on the processed and adjusted video data.

Example 23—The system of example 21 or 22, wherein the GPU performs object detection to process the video data and wherein the LED driver performs a Gamma Correction on the processed video data to adjust the processed video data.

Example 24—The system of any of examples 21-23, wherein the first interface comprises one of: an ethernet interface; a GMSL interface; a CAN bus interface; a CAN-FD bus interface; an interface defined according to a FlexRay protocol; a link defined according to a LVDS standard; and a CAN-XL bus interface, and wherein the second interface comprises an interface that operates according to a master-slave protocol.

Example 25—The system of any of examples 21-24, wherein the GPU processes the video data by performing one or more of the following steps on the video data: adjusting the video data based on navigation information; adjusting the video data to reduce glare of light projected by the LEDs based on object detection; adjusting the video data to enhance illumination of one or more objects illuminated by the LEDs based on object detection; adjusting the video data to project one or more guiding elements by the LEDs; adjusting the video data to project one or more symbols by the LEDs; adjusting the video data to project one or more guiding lines by the LEDs; adjusting the video data to shape light projected by the LEDs; and adjusting the video data to reduce intensity of at least a portion of light projected by the LEDs.

Example 26—A system comprising: a video signal source module comprising a video signal source and a first transceiver; a video signal receiver module comprising a second transceiver and a circuit configured to control LEDs; a first interface configured to communicate the video data between the video signal source module and the video signal receiver module from the first transceiver to the second transceiver; a second interface within the video signal source module, wherein the second interface is configured to communicate video data from the signal source to the first transceiver; and a third interface within the video signal receiver module, wherein the third interface is configured to communicate the video data from the second transceiver to the circuit, wherein the first interface communicates the video data at a faster data rate than the second interface, and wherein the first interface communicates the video data at a faster data rate than the third interface.

Example 27—The system of example 26, wherein the second and third interfaces are one-wire unidirectional interfaces that operate according to a master-slave protocol and wherein the first interface comprises a multi-wire differential interface.

Example 28—A method comprising: capturing video data, communicating the video data from outside of a vehicle headlamp to an LED controller within the vehicle headlamp via a first interface, and communicating the video data from the LED controller to an LED driver within the vehicle headlamp, wherein the second interface communicates the video data at a slower data rate than the first interface.

Example 29—The method of example 28, further comprising: processing the video data to create lighting effects or adjustments.

Example 30—The method of example 28 or 29, further comprising: scaling the video data to correspond to pixels in a pixel array.

Example 31—The method of any of examples 28-30, further comprising: performing gamma corrections or adaptions to the video data.

Example 32—The method of any of examples 28-31, further comprising: driving LEDs of a vehicle headlamp for advanced lighting that include adjustments or effects.

Example 33—A control circuit configured to control LED driver circuits, wherein the control circuit is configured to: generate a multicast of pixel intensity values based on data in memory or data received from a data source; and output the multicast on an interface.

Example 34—The control circuit of example 33, wherein the interface comprises a one-wire uni-directional interface.

Example 35—The control circuit of example 33 or 34, wherein the interface is a second interface and the control circuit is configured to: receive video data via a first interface in a video frame-by-video frame manner; and output the multicast via the second interface in a row-by-row manner.

Example 36—The control circuit of any of examples 33-35, wherein the multicast comprises rows of data, wherein each of the rows includes a header, a CRC code, and a plurality of the pixel intensity values.

Example 37—The control circuit of any of examples 33-36, wherein the multicast comprises rows of data, wherein at least some of the rows of data correspond to rows of LEDs within a matrix of LEDs that are driven by the one or more LED driver circuits.

Example 38—The control circuit of any of examples 33-37, wherein the multicast comprises rows of data, wherein at least some of the rows of data correspond to clusters of LEDs within a matrix of LEDs that are driven by the one or more LED driver circuits.

Example 39—The control circuit of any of examples 33-38, wherein the control circuit is configured to generate the multicast using pixel reordering of either the data in a memory or the data received from a data source.

Example 40—The control circuit of any of examples 33-39, wherein the multicast comprises a set of the pixel intensity values that is configured to be used simultaneously by two or more of the plurality of LED drivers.

Example 41—The control circuit of any of examples 33-40, wherein the multicast comprises different sets of the pixel intensity values that are defined for use by different ones of the plurality of LED drivers.

Example 42—The control circuit of any of examples 33-41, wherein the multicast comprises first and second sets of the plurality of pixel intensity values that are defined respectfully for a first LED driver associated with external lighting and a second LED driver associated with internal lighting.

Example 43—The control circuit of any of examples 33-39 or 42, wherein the multicast comprises a first set of the pixel intensity values that is configured to be used simultaneously by two or more of the plurality of LED drivers and a plurality of second sets of the pixel intensity values that are defined for use by different ones of the plurality of LED drivers.

Example 44—The control circuit of any of examples 33-43, further comprising a differential transmitter configured to receive the multicast via the interface and transmit the multicast as a differential signal.

Example 45—An LED driver circuit configured to drive a plurality of LEDs, wherein the LED driver circuit is configured to: receive a multicast of pixel intensity values via an interface, and drive the plurality of LEDs based on the multicast.

Example 46—The LED driver circuit of example 45, wherein the interface comprises a one-wire unidirectional interface.

Example 47—The LED driver circuit of example 45 or 46, wherein the LED driver circuit includes a plurality of LED drivers, wherein two or more of the plurality of LED drivers are configured to drive different sets of LEDs using a same portion of the multicast.

Example 48—The LED driver circuit of any of examples 45-47, wherein the LED driver circuit includes a plurality of LED drivers, wherein two or more of the plurality of LED drivers are configured to drive different drive sets of LEDs using different portions of the multicast.

Example 49—The LED driver circuit of any of examples 45-48, wherein the LED driver circuit is configured to receive the multicast from an LED control unit via the one-wire unidirectional interface.

Example 50—The LED driver circuit of any of examples 45-48, wherein the LED driver circuit includes a plurality of LED drivers, the LED driver circuit further comprising a differential receiver circuit configured to: receive a differential signal that comprises the multicast; and communicate the multicast to the plurality LED drivers via the interface.

Example 51—The LED driver circuit of any of examples 45-49, wherein the multicast comprises rows of data that are received in a row-by-row fashion, wherein each of the rows includes a header, a CRC code, and a plurality of the pixel intensity values.

Example 52—The LED driver circuit of example 51, wherein at least some of the rows of data correspond to rows of LEDs within a matrix of LEDs that are driven the LED driver circuit.

Example 53—The LED driver circuit of example 51 or 52, wherein at least some of the rows of data correspond to clusters of LEDs within a matrix of LEDs that are driven the LED driver circuit.

Example 54—The LED driver circuit of example 53, wherein the LED driver circuit includes a plurality of LED drivers configured to drive a plurality of clusters of LEDs, wherein each of the plurality of LED drivers corresponds to one of the plurality of clusters of LEDs.

Example 55—The LED driver circuit of any of examples 45-54, wherein the multicast comprises a set of pixel intensity values that is used simultaneously the LED driver circuit and one or more additional LED driver circuits.

Example 56—The LED driver circuit of any of examples 45-55, wherein the multicast data comprises different sets of pixel intensity values that are defined for a plurality of different LED drivers and wherein the LED driver circuit is configured to identify one or more of the sets of pixel intensity values within the multicast and drive the plurality of LEDs based on the one or more identified sets of pixel intensity values.

Example 57—The LED driver circuit of any of examples 45-54, wherein: the multicast comprises a first set of pixel intensity values that is used simultaneously by the LED driver circuit and one or more additional LED driver circuits, and the multicast comprises second sets of pixel intensity values that are defined for a plurality of different LED drivers and wherein the LED driver circuit is configured to identify one or more of the second sets of pixel intensity values within the multicast and drive the plurality of LEDs based on the one or more identified sets of pixel intensity values.

Example 58—The LED driver circuit of any of examples 45-57, further comprising a plurality of drivers configured to drive different plurality of LEDs, wherein each of the two or more drivers is configured to: receive the multicast; and drive a respective plurality of LEDs based on the multicast.

Example 59—The LED driver circuit of example 58, wherein each of the plurality of drivers is configured to drive a respective plurality of LEDs based on the multicast in a manner that is unique relative to other drivers of the plurality of drivers.

Example 60—The LED driver circuit of example 58 or 59, wherein at least one of the plurality of drivers corresponds to exterior vehicle lighting and at least one of the plurality of drivers corresponds to interior vehicle lighting.

Example 61—A circuit configured to control LEDs, the circuit comprising: an LED control circuit configured to generate a multicast of pixel intensity values based on data in memory or data received from a data source, and output the multicast on an interface, and a plurality of LED driver circuits configured to receive the multicast and drive different pluralities of the LEDs based on the multicast.

Example 62—The circuit of example 61, wherein the plurality of LED driver circuits are each configured to receive the multicast over a one-wire uni-directional interface.

Example 63—The circuit of example 61 or 62, further comprising: a differential transmitter configured to receive the multicast on the one-wire uni-directional interface and transmit the multicast as a differential signal; and a differential receiver configured to receive the multicast in the differential signal, wherein the differential transmitter and the differential receiver are between the LED control circuit and the plurality of LED driver circuits.

Example 64—The circuit of any of examples 61-63, further comprising a third interface, wherein the third interface is configured to communicate control signals between the LED control circuit and the plurality of LED driver circuits.

Example 65—The circuit of any of examples 61-64, wherein each of the plurality of drivers is configured to drive a respective plurality of LEDs based on the multicast in a manner that is unique relative to other drivers of the plurality of drivers.

Example 66—A method of controlling LEDs of a vehicle, the method comprising: generating a multicast of pixel intensity values based on data in memory or data received from a data source; and outputting the multicast on an interface.

Example 67—A method of controlling LEDs of a vehicle, the method comprising: receiving a multicast of pixel intensity values via an interface, and driving the of LEDs based on the multicast.

Example 68—A vehicle lighting system comprising LEDs and a circuit configured to control the LEDs, the circuit comprising: an LED control circuit configured to generate a multicast of pixel intensity values based on data in memory or data received from a data source, and output the multicast on an interface, and a plurality of LED driver circuits configured to receive the multicast and drive different pluralities of the LEDs based on the multicast.

Example 69—The control circuit of example 33, wherein the interface comprises a multiwire interface.

Example 70—The LED driver circuit of example 45, wherein the interface comprises a multiwire interface.

Various aspects have been described in this disclosure. These and other aspects are within the scope of the following claims.

The invention claimed is:

1. A control circuit configured to simultaneously control a plurality of different light emitting diode (LED) driver circuits, wherein the control circuit is configured to:
generate a multicast of pixel intensity values based on data in memory or data received from a data source, wherein the multicast of pixel intensity values comprises a plurality of luminance values to be used by the plurality of different LED driver circuits to drive different sets of LEDs; and
output the multicast of pixel intensity values simultaneously to each of the plurality of different LED driver circuits on an interface that connects the control circuit to each of the plurality of different LED driver circuits, wherein the interface comprises a one-wire uni-directional interface, wherein the interface is a second interface and the control circuit is configured to:
receive video data via a first interface in a video frame-by-video frame manner; and
output the multicast via the second interface in a row-by-row manner.

2. The control circuit of claim 1, wherein the multicast comprises different sets of the pixel intensity values that are defined for use by different ones of the plurality of LED drivers.

3. The control circuit of claim 1, wherein the multicast comprises first and second sets of the plurality of pixel intensity values that are defined respectfully for a first LED driver associated with external lighting and a second LED driver associated with internal lighting.

4. The control circuit of claim 1, wherein the plurality of different driver circuits is configured to drive different vehicle lights within a vehicle, and wherein the multicast includes different pixel intensity values for the different vehicle lights within the vehicle.

5. A control circuit configured to simultaneously control a plurality of different light emitting diode (LED) driver circuits, wherein the control circuit is configured to:
generate a multicast of pixel intensity values based on data in memory or data received from a data source, wherein the multicast of pixel intensity values comprises a plurality of luminance values to be used by the plurality of different LED driver circuits to drive different sets of LEDs; and
output the multicast of pixel intensity values simultaneously to each of the plurality of different LED driver circuits on an interface that connects the control circuit to each of the plurality of different LED driver circuits, wherein the multicast comprises rows of data, wherein each of the rows includes a header, a cyclical redundancy check (CRC) code, and a plurality of the pixel intensity values.

6. The control circuit of claim 5, wherein the interface comprises a one-wire uni-directional interface.

7. The control circuit of claim 6, wherein the interface is a second interface and the control circuit is configured to:
receive video data via a first interface in a video frame-by-video frame manner; and
output the multicast via the second interface in a row-by-row manner.

8. The control circuit of claim 5, wherein the multicast comprises rows of data, wherein at least some of the rows of data correspond to rows of LEDs within a matrix of LEDs that are driven by the one or more LED driver circuits.

9. The control circuit of claim 5, wherein the multicast comprises rows of data, wherein at least some of the rows of data correspond to clusters of LEDs within a matrix of LEDs that are driven by the one or more LED driver circuits.

10. A control circuit configured to simultaneously control a plurality of different light emitting diode (LED) driver circuits, wherein the control circuit is configured to:
generate a multicast of pixel intensity values based on data in memory or data received from a data source, wherein the multicast of pixel intensity values comprises a plurality of luminance values to be used by the plurality of different LED driver circuits to drive different sets of LEDs; and
output the multicast of pixel intensity values simultaneously to each of the plurality of different LED driver circuits on an interface that connects the control circuit to each of the plurality of different LED driver circuits, wherein the control circuit is configured to generate the multicast using pixel reordering of either the data in a memory or the data received from a data source.

11. The control circuit of claim 10, wherein the multicast comprises a set of the pixel intensity values that is configured to be used simultaneously by two or more of the plurality of LED drivers.

12. A control circuit configured to simultaneously control a plurality of different light emitting diode (LED) driver circuits, wherein the control circuit is configured to:
generate a multicast of pixel intensity values based on data in memory or data received from a data source, wherein the multicast of pixel intensity values comprises a plurality of luminance values to be used by the plurality of different LED driver circuits to drive different sets of LEDs; and
output the multicast of pixel intensity values simultaneously to each of the plurality of different LED driver circuits on an interface that connects the control circuit to each of the plurality of different LED driver circuits, wherein the multicast comprises a first set of the pixel intensity values that is configured to be used simultaneously by two or more of the plurality of LED drivers and a plurality of second sets of the pixel intensity values that are defined for use by different ones of the plurality of LED drivers.

13. The control circuit of claim 12, further comprising a differential transmitter configured to receive the multicast via the interface and transmit the multicast as a differential signal.

14. A light emitting diode (LED) driver circuit configured to drive a plurality of LEDs, wherein the LED driver circuit is configured to:
receive a multicast of pixel intensity values via an interface, wherein the multicast of pixel intensity values comprises a plurality of luminance values to be used the LED driver circuit to drive the plurality of LEDs and by one or more different LED driver circuits to drive different sets of LEDs, and
drive the plurality of LEDs based on at least some of the luminance values in the multicast, wherein the LED driver circuit includes a plurality of LED drivers, wherein two or more of the plurality of LED drivers are configured to drive different sets of LEDs using a same portion of the multicast.

15. The LED driver circuit of claim 14, wherein the interface comprises a one-wire unidirectional interface.

16. The LED driver circuit of claim 14, wherein the LED driver circuit includes a plurality of LED drivers, wherein two or more of the plurality of LED drivers are configured to drive different drive sets of LEDs using different portions of the multicast.

17. The LED driver circuit of claim 14, wherein the LED driver circuit is configured to receive the multicast from an LED control unit via the one-wire unidirectional interface.

18. The LED driver circuit of claim 14, wherein the LED driver circuit includes a plurality of LED drivers, the LED driver circuit further comprising a differential receiver circuit configured to:
  receive a differential signal that comprises the multicast; and
  communicate the multicast to the plurality LED drivers via the interface.

19. The LED driver circuit of claim 14, wherein the multicast comprises rows of data that are received in a row-by-row fashion, wherein each of the rows includes a header, a cyclical redundancy check (CRC) code, and a plurality of the pixel intensity values.

20. The LED driver circuit of claim 19, wherein at least some of the rows of data correspond to rows of LEDs within a matrix of LEDs that are driven the LED driver circuit.

21. The LED driver circuit of claim 19, wherein at least some of the rows of data correspond to clusters of LEDs within a matrix of LEDs that are driven the LED driver circuit.

22. The LED driver circuit of claim 21, wherein the LED driver circuit includes a plurality of LED drivers configured to drive a plurality of clusters of LEDs, wherein each of the plurality of LED drivers corresponds to one of the plurality of clusters of LEDs.

23. The LED driver circuit of claim 14, wherein the multicast comprises a set of pixel intensity values that is used simultaneously the LED driver circuit and one or more additional LED driver circuits.

24. The LED driver circuit of claim 14, wherein the multicast data comprises different sets of pixel intensity values that are defined for a plurality of different LED drivers and wherein the LED driver circuit is configured to identify one or more of the sets of pixel intensity values within the multicast and drive the plurality of LEDs based on the one or more identified sets of pixel intensity values.

25. The LED driver circuit of claim 14, wherein
  the multicast comprises a first set of pixel intensity values that is used simultaneously by the LED driver circuit and one or more additional LED driver circuits, and
  the multicast comprises second sets of pixel intensity values that are defined for a plurality of different LED drivers and wherein the LED driver circuit is configured to identify one or more of the second sets of pixel intensity values within the multicast and drive the plurality of LEDs based on the one or more identified sets of pixel intensity values.

26. The LED driver circuit of claim 14, further comprising a plurality of drivers configured to drive different plurality of LEDs, wherein each of the two or more drivers is configured to:
  receive the multicast; and
  drive a respective plurality of LEDs based on the multicast.

27. The LED driver circuit of claim 26, wherein each of the plurality of drivers is configured to drive a respective plurality of LEDs based on the multicast in a manner that is unique relative to other drivers of the plurality of drivers.

28. The LED driver circuit of claim 26, wherein at least one of the plurality of drivers corresponds to exterior vehicle lighting and at least one of the plurality of drivers corresponds to interior vehicle lighting.

29. A control circuit configured to simultaneously control a plurality of different light emitting diode (LED) driver circuits, wherein the control circuit is configured to:
  generate a multicast of pixel intensity values based on data in memory or data received from a data source, wherein the multicast of pixel intensity values comprises a plurality of luminance values to be used by the plurality of different LED driver circuits to drive different sets of LEDs; and
  output the multicast of pixel intensity values simultaneously to each of the plurality of different LED driver circuits on an interface that connects the control circuit to each of the plurality of different LED driver circuits, wherein the plurality of different driver circuits is configured to drive different subsets of pixels within a matrix of LEDs that forms a vehicle headlamp, and wherein the multicast includes different pixel intensity values for the different subset of pixels within the matrix of LEDs.

30. The control circuit of claim 29, wherein the multicast of pixel intensity values comprises the plurality of luminance values and a plurality of chrominance values.

* * * * *